(12) United States Patent
Eichel et al.

(10) Patent No.: US 11,915,308 B2
(45) Date of Patent: Feb. 27, 2024

(54) BLOCKCHAIN DATA EXCHANGE NETWORK AND METHODS AND SYSTEMS FOR SUBMITTING DATA TO AND TRANSACTING DATA ON SUCH A NETWORK

(71) Applicant: Miovision Technologies Incorporated, Kitchener (CA)

(72) Inventors: Justin A. Eichel, Kitchener (CA); Kurtis N. McBride, Kitchener (CA); Jean-Pierre Bhavnani, Waterloo (CA); Jan Bergstrom, Elora (CA)

(73) Assignee: Miovision Technologies Incorporated, Kitchener (CA)

( * ) Notice: Subject to any disclaimer, the term of this patent is extended or adjusted under 35 U.S.C. 154(b) by 243 days.

(21) Appl. No.: 17/250,009

(22) PCT Filed: May 10, 2019

(86) PCT No.: PCT/CA2019/050632
§ 371 (c)(1),
(2) Date: Oct. 29, 2020

(87) PCT Pub. No.: WO2019/213779
PCT Pub. Date: Nov. 14, 2019

(65) Prior Publication Data
US 2021/0097602 A1    Apr. 1, 2021

Related U.S. Application Data

(60) Provisional application No. 62/669,516, filed on May 10, 2018.

(51) Int. Cl.
*G06Q 30/08* (2012.01)
*G06Q 20/12* (2012.01)
(Continued)

(52) U.S. Cl.
CPC ......... *G06Q 30/08* (2013.01); *G06Q 20/1235* (2013.01); *G06Q 30/0623* (2013.01);
(Continued)

(58) Field of Classification Search
CPC ............... G06Q 30/08; G06Q 20/1235; G06Q 30/0623; H04L 9/50
See application file for complete search history.

(56) References Cited

U.S. PATENT DOCUMENTS 5,621,885 A    4/1997  Del Vigna, Jr.
6,006,031 A   12/1999  Andrews et al.
(Continued)

FOREIGN PATENT DOCUMENTS

CA    2820772 A1    6/2012
CA    2882973 A1    8/2015
(Continued)

OTHER PUBLICATIONS

Supporting private data on hyperledger fabric with secure multi-party computation. Benhamouda, Fabrice; Halevi, Shai; Halevi, Tzipora. 2018 IEEE International Conference on Cloud Engineering (IC2E). Proceedings: 357-63. IEEE Computer Society. (2018) (Year: 2018).*

(Continued)

*Primary Examiner* — Michael Misiaszek
(74) *Attorney, Agent, or Firm* — CPST Intellectual Property Inc.; Brett J. Slaney

(57) ABSTRACT

A system and method are provided for transacting data on a network. The system includes a data submission interface, the data submission interface configured to enable one or more data generators to register data with the network, the data being stored in a location accessible to data consumers accessing the network. The system also includes a data consumer interface to enable one or more data consumers to (Continued)

find data on the network and transact with the one or more data generators to obtain access to and/or ownership of data submitted to the network. The system also includes a blockchain network for storing at least a ledger associated with data registered with the network via the data submission interface to provide an immutable assignment of ownership rights of the data to the respective one or more data generators, and to provide an immutable record of data transactions.

35 Claims, 19 Drawing Sheets

(51) Int. Cl.
 G06Q 30/0601 (2023.01)
 H04L 9/06 (2006.01)
 G06F 16/21 (2019.01)
 H04L 9/00 (2022.01)
(52) U.S. Cl.
 CPC .......... H04L 9/0618 (2013.01); G06F 16/211 (2019.01); H04L 9/50 (2022.05)

(56) References Cited

U.S. PATENT DOCUMENTS

| | | | |
|---|---|---|---|
| 6,317,871 | B1 | 11/2001 | Andrews et al. |
| 6,425,118 | B1 | 7/2002 | Molloy et al. |
| 7,240,931 | B1 | 7/2007 | Casey |
| D766,131 | S | 9/2016 | Harding et al. |
| 9,760,702 | B1 | 9/2017 | Kursun et al. |
| 11,282,139 | B1* | 3/2022 | Winklevoss ........... G06Q 40/04 |
| 2002/0129104 | A1 | 9/2002 | Trossen |
| 2004/0147291 | A1 | 7/2004 | Zhang et al. |
| 2006/0168425 | A1 | 7/2006 | Del Vigna, Jr. et al. |
| 2006/0168434 | A1 | 7/2006 | Del Vigna, Jr. et al. |
| 2006/0230375 | A1 | 10/2006 | Casey et al. |
| 2007/0294576 | A1 | 12/2007 | Del Vigna, Jr. et al. |
| 2008/0191902 | A1 | 8/2008 | Kolb |
| 2009/0285261 | A1 | 11/2009 | Casey et al. |
| 2010/0057624 | A1 | 3/2010 | Hurt et al. |
| 2011/0208414 | A1 | 8/2011 | Althen et al. |
| 2012/0029799 | A1 | 2/2012 | Miller |
| 2012/0081235 | A1 | 4/2012 | Nadeem et al. |
| 2012/0083996 | A1 | 4/2012 | Tas et al. |
| 2012/0226434 | A1 | 9/2012 | Chiu et al. |
| 2013/0291859 | A1 | 11/2013 | Casey et al. |
| 2015/0015420 | A1 | 1/2015 | Miller |
| 2015/0066340 | A1 | 3/2015 | Nelson |
| 2015/0294069 | A1 | 10/2015 | Shah |
| 2016/0123620 | A1 | 5/2016 | Orsini et al. |
| 2017/0161829 | A1* | 6/2017 | Mazier ................. G06Q 40/06 |
| 2017/0178172 | A1 | 6/2017 | Balasubramanian et al. |
| 2017/0206783 | A1 | 7/2017 | Miller |
| 2017/0214522 | A1 | 7/2017 | Code et al. |
| 2017/0279774 | A1* | 9/2017 | Booz ................. G06Q 20/0658 |
| 2018/0018877 | A1 | 1/2018 | Townsend |
| 2018/0018888 | A1 | 1/2018 | Townsend |
| 2019/0205873 | A1* | 7/2019 | Kamalsky ............ G06Q 20/389 |
| 2019/0253431 | A1* | 8/2019 | Atanda ................. G06F 21/62 |

FOREIGN PATENT DOCUMENTS

| | | |
|---|---|---|
| CA | 2882990 A1 | 8/2015 |
| CN | 1208302 A | 2/1999 |
| CN | 101415022 A | 4/2009 |
| CN | 104751627 A | 7/2015 |
| CN | 105245405 A | 1/2016 |
| CN | 105374206 A | 3/2016 |
| CN | 201510903455 B | 3/2016 |
| CN | 105679041 A | 6/2016 |
| CN | 106557855 A | 4/2017 |
| CN | 106951913 A | 7/2017 |
| CN | 207070483 U | 3/2018 |
| DE | 102010033324 A1 | 2/2012 |
| DE | 10201222780 A1 | 6/2014 |
| DE | 102013205057 A1 | 8/2014 |
| DE | 102013204424 B3 | 9/2014 |
| DE | 102013227144 A1 | 12/2014 |
| DE | 102014203226 A1 | 8/2015 |
| DE | 102014218191 A1 | 3/2016 |
| DE | 102015206439 A1 | 10/2016 |
| DE | 102015215605 A1 | 2/2017 |
| DE | 102015226224 A1 | 5/2017 |
| DE | 102016202608 A1 | 8/2017 |
| DE | 102016215914 A1 | 3/2018 |
| DE | 102016215915 A1 | 3/2018 |
| DE | 102016215917 A1 | 3/2018 |
| EP | 0301855 A2 | 2/1989 |
| EP | 1727311 A1 | 11/2006 |
| EP | 2166764 A1 | 3/2010 |
| EP | 2315189 A2 | 4/2011 |
| EP | 2320403 A2 | 5/2011 |
| EP | 2618320 A1 | 7/2013 |
| EP | 2660756 A1 | 11/2013 |
| EP | 2779137 A1 | 9/2014 |
| EP | 2887332 A1 | 6/2015 |
| EP | 3062301 A1 | 8/2016 |
| EP | 3073459 A1 | 9/2016 |
| EP | 3151214 A1 | 4/2017 |
| EP | 3176768 A1 | 6/2017 |
| GB | 8717853 | 9/1987 |
| GB | 1201415 | 3/2012 |
| JP | 1526268 F | 6/2015 |
| JP | 2017030894 A | 2/2017 |
| TW | 201719561 A | 6/2017 |
| WO | 9611437 A1 | 4/1996 |
| WO | 9613784 A2 | 5/1996 |
| WO | 2005038741 A2 | 4/2005 |
| WO | 2005049177 A1 | 6/2005 |
| WO | 2006018304 A2 | 2/2006 |
| WO | 2008015316 A1 | 2/2008 |
| WO | 2009012285 A1 | 1/2009 |
| WO | 2009040217 A1 | 4/2009 |
| WO | 2010007216 A1 | 1/2010 |
| WO | 2010037581 A1 | 4/2010 |
| WO | 2010049595 A1 | 5/2010 |
| WO | 2010124933 A1 | 11/2010 |
| WO | 2011120194 A1 | 10/2011 |
| WO | 2012126509 A1 | 9/2012 |
| WO | 2013110815 A1 | 8/2013 |
| WO | 2015024129 A1 | 2/2015 |
| WO | 2015024964 A2 | 2/2015 |
| WO | 2015197758 A1 | 12/2015 |
| WO | 2016128078 A1 | 8/2016 |
| WO | 2017109140 A1 | 6/2017 |
| WO | 2017180382 A1 | 10/2017 |
| WO | 2019161501 A1 | 8/2019 |

OTHER PUBLICATIONS

Build the New Ecosystem for the Data Era—Introduction of scry. info. M2 Presswire Oct. 17, 2017: NA. (Year: 2017).*
International Search Report issued in parent PCT application No. PCT/CA2019/050632; search completed Jul. 5, 2019.
Toyota Press Release of May 22, 2017; https://media.toyota.ca/releases/toyota-research-institute-explores-blockchain-technology-for-development of-new-mobility-ecosystem; retrieved from the Internet Oct. 27, 2020.

* cited by examiner (a) $df = 3$ polynomial utilizing 21 months of samples (b) df = 4 polynomial utilizing 21 months of samples (c) df = 5 polynomial utilizing 21 months of samples

BLOCKCHAIN DATA EXCHANGE NETWORK AND METHODS AND SYSTEMS FOR SUBMITTING DATA TO AND TRANSACTING DATA ON SUCH A NETWORK

CROSS-REFERENCE TO RELATED APPLICATION(S)

This application is a National Entry of PCT Application No. PCT/CA2019/050632, filed on May 10, 2019, which claims priority to U.S. Provisional Patent Application No. 62/669,516 filed on May 10, 2018. The entire contents of the aforementioned applications are incorporated herein by reference as if set forth in their entirety.

TECHNICAL FIELD

The following relates to a data exchange network and transaction system using a blockchain for storing such transactions, and relates to methods and systems for performing data submission and retrieval/purchase transactions on such a data exchange network.

BACKGROUND

Over the last decade there has been much discussion about the "Smart City". While this term has gained mainstream acceptance, to date most of the implementations have been vendor-specific. That is, an architecture has not emerged which can be considered an opportunity to change the fundamental operations or economics of cities in the same way that TCP/IP did for the Internet. It is recognized that to fully live up to its potential, the Smart City requires the development of a fundamental architecture that drives data standardization and built-in economic incentive. The development of such a protocol can allow cities and private entities to: (1) monetize the data generated from infrastructure assets, and (2) allow costs that have traditionally been external, to be priced into the economics of infrastructure.

For the purpose of illustration, consider a traffic intersection operated by a city as an example of a piece of infrastructure that would benefit from such a smart city protocol. Cities operate intersections which generate data with the primary objective to satisfy the needs of citizens through operating an efficient and safe traffic system. While this is the primary objective of data generated by the intersection, commercial entities can also benefit from this data. For example, shipping companies can reduce costs by using historic and real-time traffic patterns to optimize shipping routes and reduce package delivery times. Retail operators are interested in this data to determine the location of their next store or outlet. Since the cities have tended to focus the use of data on operations rather than serving these private interests, there is an underserved data consumption market.

Historically, cities and municipalities have faced challenges when sharing their data. First, there is no standard mechanism or data format to share data. Often data is shared through comma separated values (CSV) or spreadsheet files, uniquely formatted by their creators for the purpose of operations. Second, many commercial entities and even cities and municipalities do not keep track of what data is available for consumption. The data is often created and immediately consumed to satisfy an immediate need without other potential consumers being aware. Third, determining a fair market price is challenging and the focus of many economic theories.

Traditional markets do not provide a system conducive towards data trade. One challenge is that the government agency is focused on operations and does not have excess operating budget to spend creating a data sales force, especially while navigating politics and using its budget to address poverty, crime, health care, and education to name a few.

To maximize profit and find market equilibrium, the data seller typically requires extensive market modelling. They need to understand their customer demand for existing data and their customer demand for new types of data schemas or new locations to be measured. They need to understand the impact of their data in other cities (e.g., growth or safety trends given prior city structure). They need to understand seasonal pricing changes and the granularity of location and temporal data. There can be a heavy burden of knowledge placed on the seller. When the seller is a city or municipality, the burden may outweigh the monetary benefits.

Traditional data exchange transactions have a typical workflow as shown in FIG. 1. Working backwards, a data consumer 10 purchases aggregated data 12 from a data aggregator 14, who in turn has purchased processed data 16 from a data processor 18, who purchased raw data 20 from one or more data generators 22. In many cases these functions are performed by the same entity however the flow and value exchange are typically the same.

It is recognized that the data generator 22 who deployed the data-capturing technology sees the least value in this exchange. Likewise, the data aggregator 14 who employs costly business development and sales teams see the most. As a result, there is less incentive for data capturing technologies to be deployed as the return on investment is relatively small.

Additionally, due to the expensive nature of developing new markets, it is found to be uncommon for data to be sold to multiple buyers for multiple purposes. This represents missed opportunities for the data generator 22, data processor 18, and data aggregator 14.

In traditional data markets, the following summarizes situations that often arise: a limited value in data generation, the largest portion of value being earned by data processor 18/data aggregator 14, reduced incentive to reach data-generating ubiquity, and data often being sold once for a single purpose.

It is an object of the following to address at least one of the above-noted challenges.

SUMMARY

Data marketplaces and exchanges typical exist within niche domains and economically favor the final point of sale. Economic incentives are drawn out by value added services in the middle of transactions leaving little incentive for the data generators. Likewise, many data generators simply don't have the ability or knowledge to capitalize on their data generating assets effectively or efficiently. The proposed system provides a data marketplace leveraging a blockchain, combined with a data price discovery system and suggested applications where data generating infrastructure can be subsidized through the economic benefits of the system.

In one aspect, there is provided a system for transacting data on a network, the system comprising: a data submission interface, the data submission interface configured to enable one or more data generators to register data with the network, the data being stored in a location accessible to data consumers accessing the network; a data consumer interface to enable one or more data consumers to find data on the network and transact with the one or more data generators to obtain access to and/or ownership of data submitted to the network; and a blockchain network for storing at least a ledger associated with data registered with the network via the data submission interface to provide an immutable assignment of ownership rights of the data to the respective one or more data generators, and to provide an immutable record of data transactions.

In another aspect, there is provided a method of transacting data on a network, comprising: providing a data submission interface to enable one or more data generators to register data with the network, and to enable the data to be stored in a location accessible to data consumers accessing the network; providing a data consumer interface to enable one or more data consumers to find data on the network and transact with the one or more data generators to obtain access to and/or ownership of data submitted to the network; and providing a blockchain network for storing at least a ledger associated with data registered with the network via the data submission interface to provide an immutable assignment of ownership rights of the data to the respective one or more data generators, and to provide an immutable record of data transactions.

In yet another aspect, there is provided a computer readable medium comprising instructions for performing the method.

BRIEF DESCRIPTION OF THE DRAWINGS

Embodiments will now be described with reference to the appended drawings wherein.

DETAILED DESCRIPTION

Figure 1:
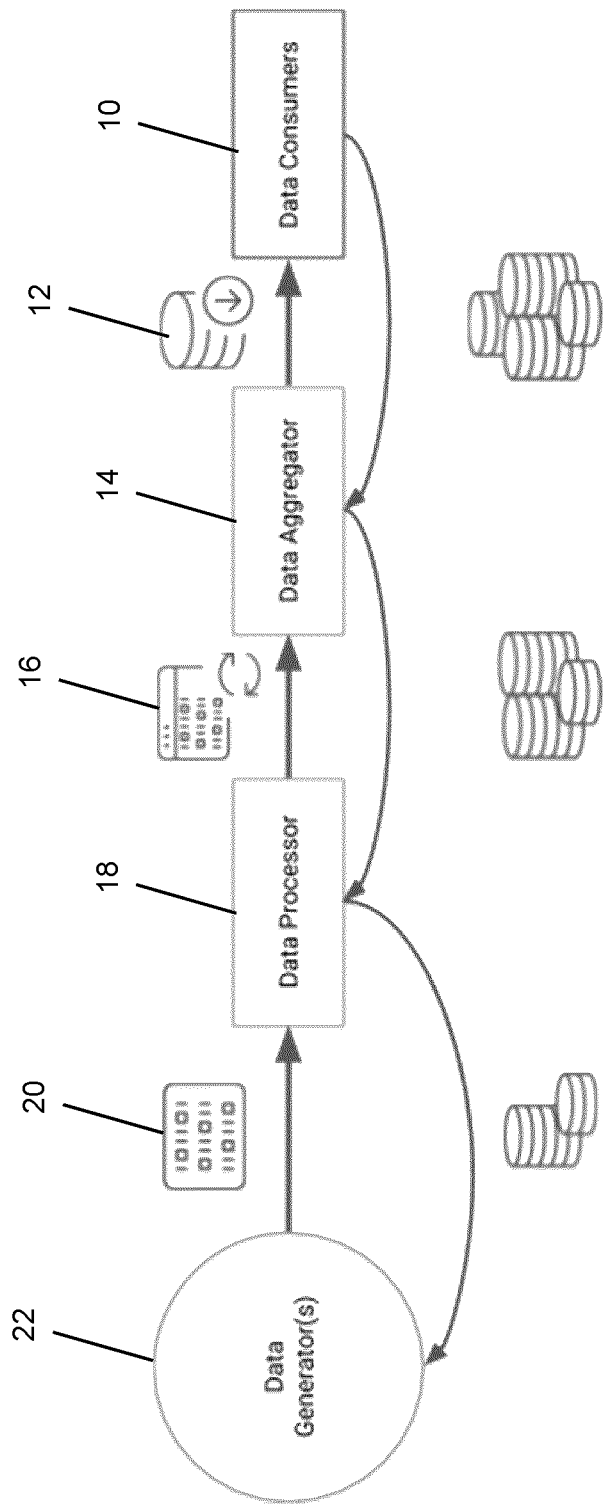
FIG. 1 is a schematic diagram of an existing data transaction marketplace.

It has been found that a distributed application (or "dApp") 38 within a smart city network and using an underlying blockchain infrastructure can be used to facilitate the exchange of data 12, 20 between data generators 22 and data consumers 10, removing expensive processing and overhead in between. Data processors 18 and aggregators 14 in such a network and infrastructure can be treated similarly to data generators 22, however in this model the value earned is directly represented by the value-add of their function.

Figure 2:
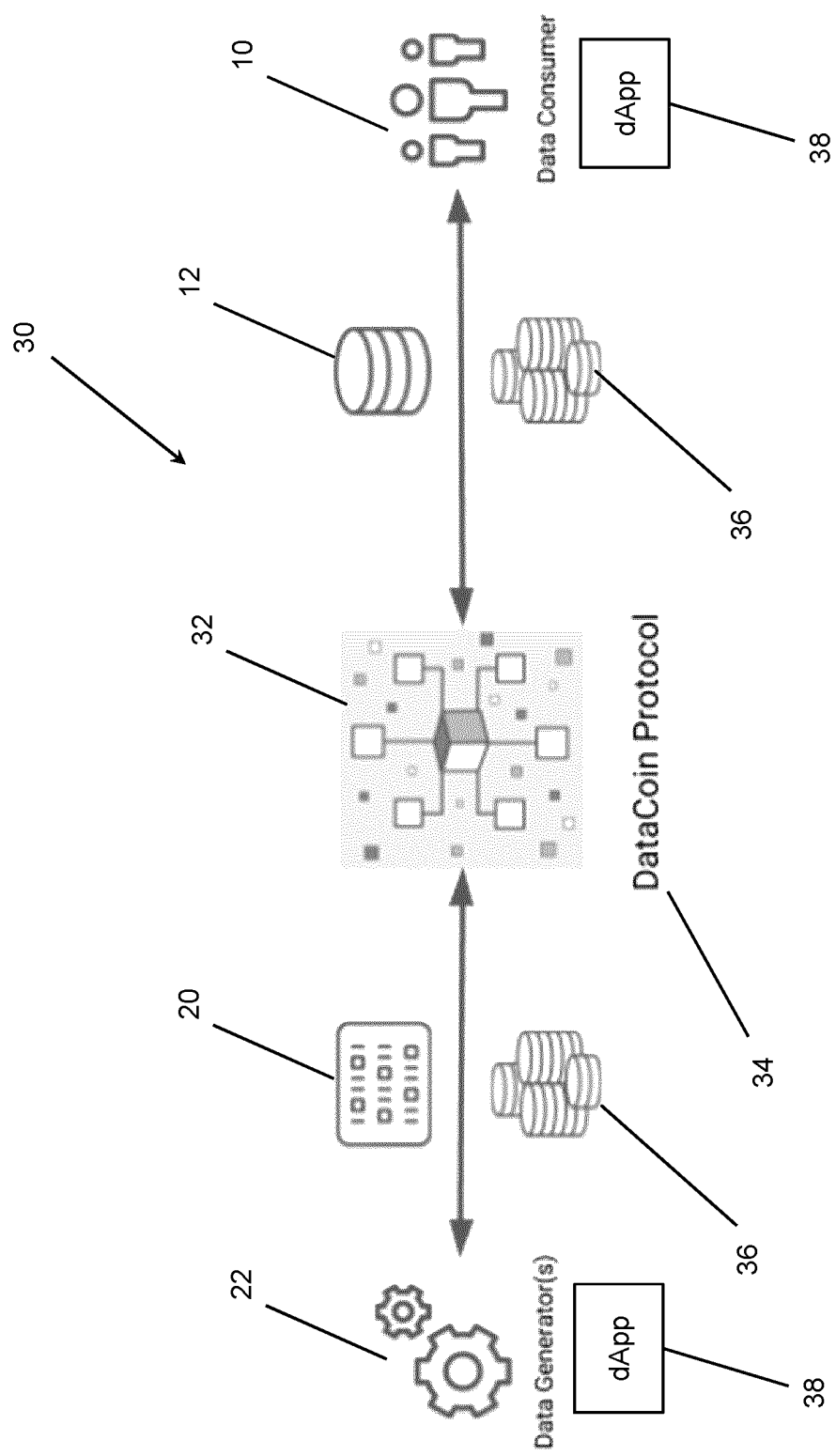
FIG. 2 is a schematic diagram of a blockchain-based network for conducting data transactions.

Turning now to FIG. 2, a schematic diagram of a data exchange system 30 is shown, that utilizes an underlying blockchain network 32. The blockchain network 32 in this example supports the use of a cryptocurrency, hereinafter referred to as an "Open City Token" or generally as a protocol "token" 36, which is utilized within an exchange protocol 34, described in greater detail later. It is understood that additional tokens can be created on top of the Open City cryptocurrency, which will allow one or more types of tokens to be created and issued for one or more types of tasks. Using the underlying blockchain network 32, the economic transfer of value is carried out directly within the protocol 34, removing the need for sales, business development, and financial institution overhead traditionally provided by "middle men" in the process (e.g., as shown in FIG. 1). This economic value exchange is abstracted using the distributed application token 36. As can be seen in FIG. 2, data generators 22 can market their data 20 directly into the blockchain network 32 for consumption by the data consumer 10, providing an incentive for more data generators 22 to provide their data into the market.

Figure 3:
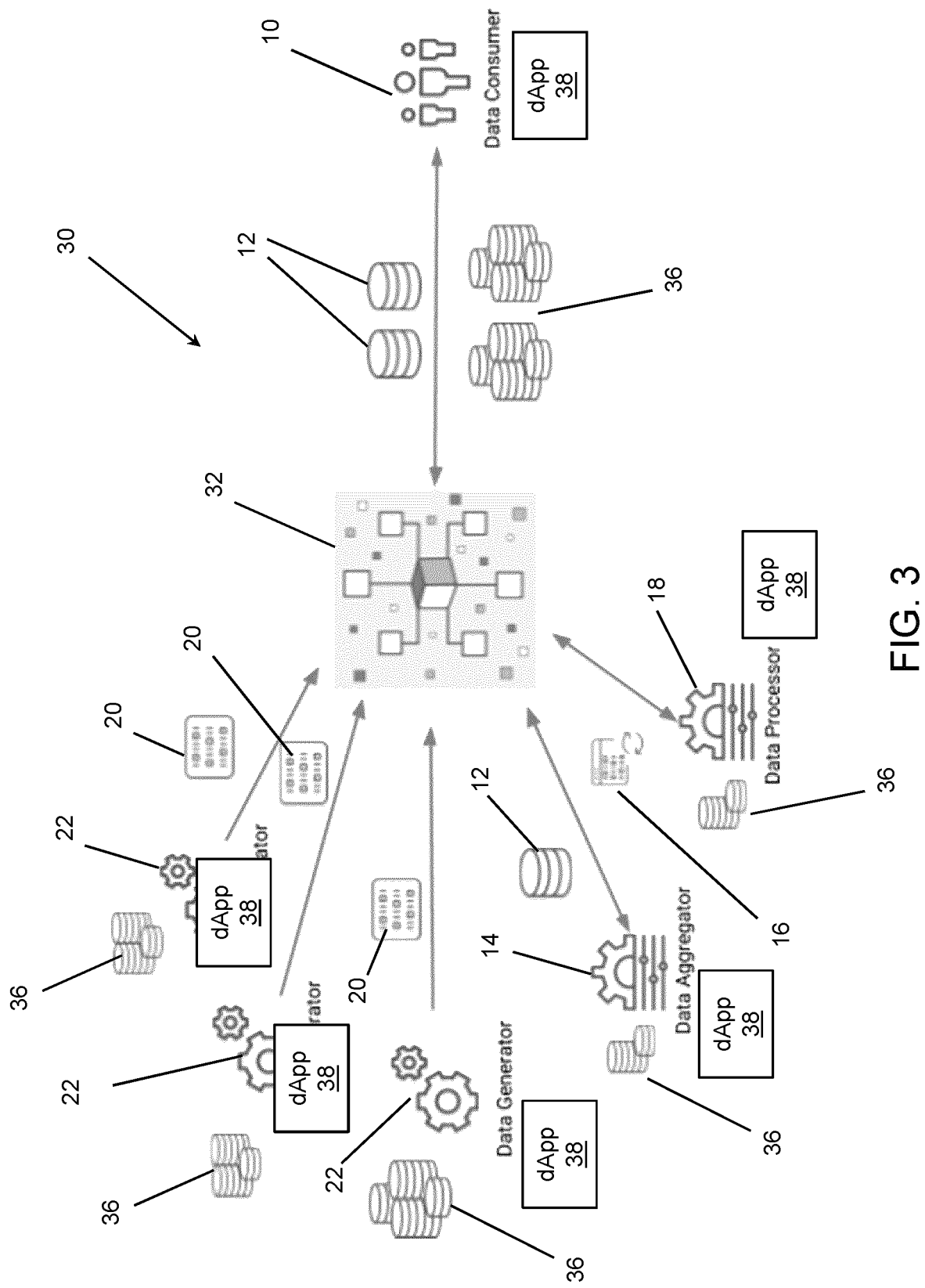
FIG. 3 is a schematic diagram of a blockchain-based network in a more detailed implementation.

Considering the traditional marketplace example, with data generators 22, aggregators 14, and processors 18, the schematic diagram shown in FIG. 3 depicts the roles of all involved parties. That is, the data aggregators 14 and data processors 18 can contribute to the blockchain network 32 and marketplace enabled on that network 32 in the same way as the data generators 22, with value being derived for the additional role that they provide. It can be appreciated that since the data aggregators 14 and data processors 18 are not positioned as "middle men" in this environment, the value brought, and revenue generated, is more aligned with their incremental portion of the value chain and may end up being similar to the net revenue achieved in the traditional marketplace.

Figure 4:
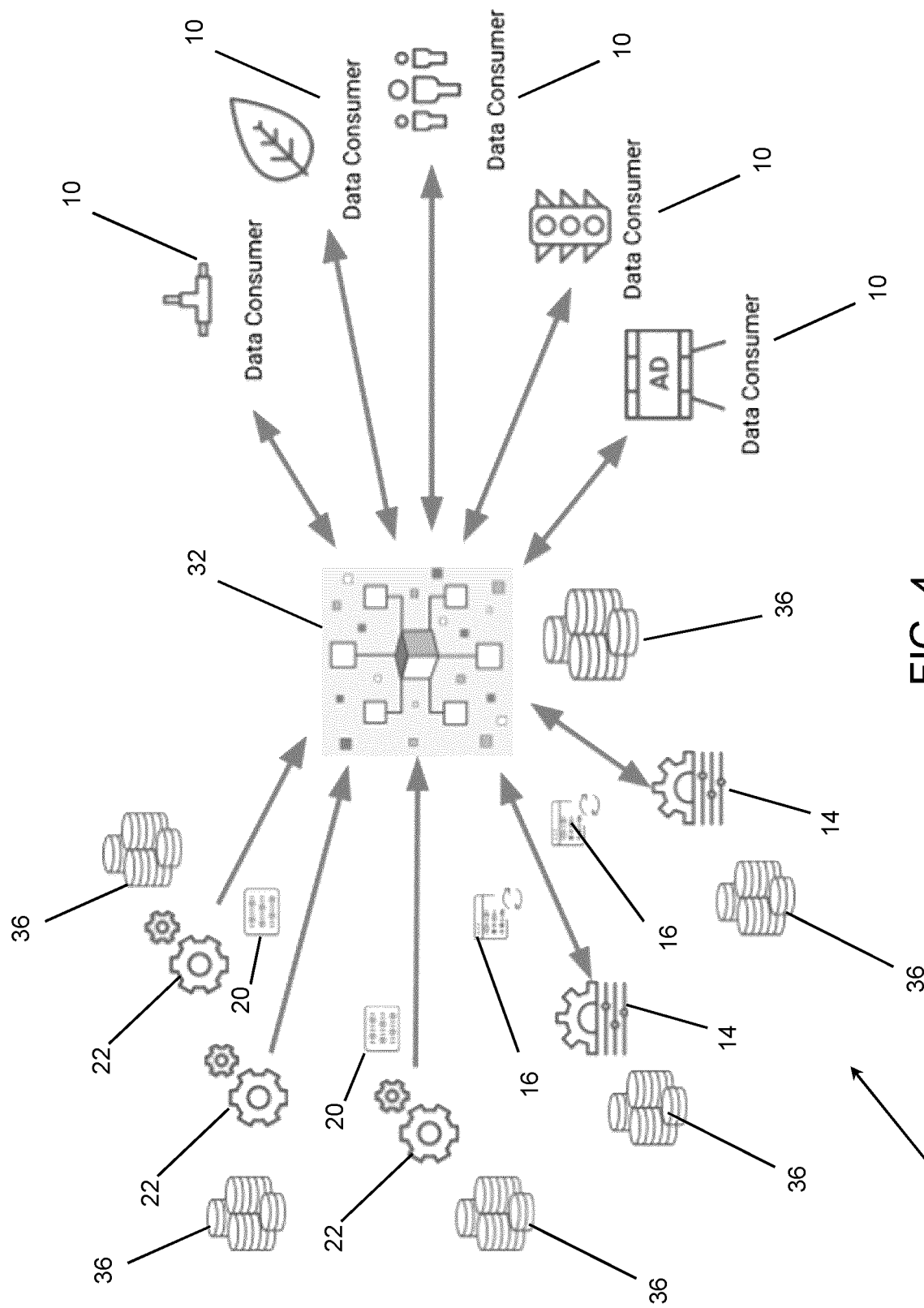
FIG. 4 is a schematic diagram of a blockchain-based network in a more detailed implementation.

The scalability and power of the distributed application 38, deployed within or in connection with the network 32 becomes more evident as more data consumers 10 join the system 30 and begin utilizing existing data 12, 16, 20, as depicted in one example provided in FIG. 4. It can be appreciated that the dApp 38 is omitted from FIG. 4 for clarity in illustration.

To provide an illustrative example of the value of the network 32, protocol 34 and distributed application 38 (facilitating participation in the network 32), consider traffic intersection vehicle count data 20 (from data generator(s) 22) originally targeted for an engineering firm (data consumer 10). In this example, it can be appreciated that this same data 20 may be used by the water works department, environmental agencies, traffic operations departments and advertising agencies. The true value of the data 20 can be recognized by the generator 22 by exposing it for consumption via the blockchain network 32. However, in practical terms it has been recognized that the data generator 22 may not have their own sales team, may not know the value of their data 20, and may not know how to provide their data 20 in a usable form to the data consumer 10. The system described herein addresses these challenges by providing a computer implemented platform and technological components, modules and processes providing the following functionality: a) data and schema discovery, b) maximized revenue for the data generator 22, c) economic value exchange, and d) security and reliability.

a) Data and Schema Discovery

This function provides the ability to search an index of available data represented by schemas, using the distributed application 38. The system 30 can be configured such that third parties may consume the index and expose a value-add service to provide search and discoverability of data within the application 38, and can compete for the best search engine on the network 32.

b) Maximized Revenue for Data Generator

The distributed application 38 can also include a price discovery mechanism. Price discovery is considered to be important to the valuation (and therefore price setting) of the data 20 submitted to the system 30. The protocol 34 can use a proprietary scheme using one-sided market (buyer) information to determine the price at which the data generator 22 achieves the maximum return. Inherent in this scheme are transaction fees, and rewards that ensure fair and honest behaviours, as discussed in greater detail later. The price discovery mechanism transaction fees can be used as a reward mechanism for honest buyers. Additionally, a "buy now" like option can be used. It can be appreciated that other price setting schemes can be used. For example, alternative price setting mechanisms can be used such as a seller-set floor price and auction, fixed seller pricing etc. The effectiveness in maximizing revenue (or other target) of the price setting system will depend on the types of data being submitted and established market. Since the system 30 uses one-sided market dynamics to determine the price of data 20, it follows that a clearing period should take place and some bids (described further below) would not be sufficient to purchase the data 20. As an alternative to repeated attempts at purchasing data, the buy now option for the data consumer 10 can be provided to guarantee the purchase of the data 20, albeit at a premium price. The distributed application 38 can optionally include a price discovery mechanism 90 (discussed by way of example below). The price discovery mechanism 90, if utilized, should be designed to achieve the desired goals of the system (i.e., the objective). The objective may be to maximize revenue for the data generators, to maximize volume of transactions and so on. A variety of price discovery mechanisms 90 could be employed including but not limited to deterministic pricing functions, auctions, artificial intelligence etc.

c) Economic Value Exchange

The token 36 can be used as the "atomic" unit of value exchange inside the network 32 and distributed application 38. This token 36 effectively creates the mechanism for a transactional economy allowing data generators 22 and data consumers 10 to buy and sell data through the application 39 without traditional overhead.

Tokens 36 can also be exchanged to access collections, streams, or partial streams of data generated from data generators 22. Further, tokens 36 can be exchanged for live or upcoming data through access to a generated data stream. For example, a data consumer 10 may wish to purchase all data generated over the next week from a specified data generator 22, and depending on the storage mechanism, can access the data stream for the duration as it arrives and/or can access records or duplicates of the data stream that might be stored elsewhere with a given latency. Each stream can also have one or more owners who share in the revenue collected when their corresponding share is licensed or accessed.

It may be noted that the transactions described above have been described in the context of "buying" or "selling" data 20. It can be appreciated that in practice, these transactions may or may not transfer ownership of the data 20, but also correspond to the selling of a license to use, analyze or derive further data (e.g., as aggregated data 12 or processed data 16). The ownership of the data asset remains with the original owner and future transactions of that same data 20 can continue to be paid to this owner. As a licensor of the data 20, the data consumer 10 (buyer) may optionally be entitled to derive new forms of data, transform, and aggregate it with other sources, collectively new data 20'. This new data 20' may be submitted back into the protocol 34 and network 32 under a new schema. Due to the nature of the blockchain network 32, these transactions and rights can be made completely transparent and immutable.

In addition to facilitating the exchange of data licenses (the right to use and analyze data) a data generator 22 may elect to sell the data asset itself. In this scenario, the ownership of the data asset is transferred to the purchaser and all subsequent data license transactions are paid to the new owner. Data generators 22 interested in larger one-time sales of their assets may choose this option as an alternative to smaller on-going sales. Likewise, data "investors" may choose to buy up as many data assets as they can speculating that license revenue from these assets will continue to grow. A data generator may also choose to sell ownership of all subsequently generated data from their data source for a period of time, or the life of the generator. In this case, as new data assets are generated, the ownership is assigned to the purchaser. Also, it can be appreciated that lenders may be willing to allow borrowing against a revenue-generating data asset.

Both ownership and licensing concepts apply to existing data and datasets and also data streams. The tokens 36 can also be used to transfer ownership of data, data streams, or partial data streams. In these cases, a buyer would submit an offer to license all or part of a data stream. Upon acceptance of the offer, the payment would be distributed to owners of the corresponding data stream portions. Similarly, a buyer can submit a bid to transfer ownership of all or part of a data stream with a similar corresponding workflow.

The following types of data purchases are made possible by the application 38. The ability to purchase historical data of a specified schema filtered by date/time or other schema fields and the ability to purchase a subscription to a stream of data of a specified schema for a specified length of time, while adhering to specified schema fields. For example, a consumer may purchase historical volume counts for a city's main intersection from September 2011 to September 2012. Likewise, a consumer may purchase a stream of volume counts for 24 hours at the city's main intersection commencing immediately. It should be noted that if the consumer chooses not to access the data stream for the purchased period of time, they may have no further ability to get access to this data or any ability to recover their paid funds.

In addition to the above, a "future" purchase may also be carried out by a data consumer. In this case, the data consumer commits to purchase a set amount of data that doesn't yet exist, for a specific schema from a data generator or data generators that may or may not yet exist. If the data becomes available before a specified expiry date, the transaction will be completed with the data generator being paid and consumer supplied with the requested data. For these "future"-type transactions, the record of the future is stored in the blockchain as well as the completion and payment of the subsequent data exchange. The funds for the transaction may optionally be held in escrow to ensure availability when the data is provided.

Another form of future purchase allows for a data consumer to purchase data that achieves a target price value for a given period of time. This may be a minimum, maximum or average price that was achieved during the specified window. Again, in this case the data generator may not yet exist. Completion and execution of the transaction follows the same process outlined in the previous future example.

Various market transactions may also occur and are linked to the license terms of the data. For example, the following scenarios may occur:

1) Single data generator, single data transaction sold to multiple potential buyers, single, exclusive winner.
2) Single data generator, single data transaction sold to multiple potential buyers, multiple winners
3) Multiple data generators (for single schema), single data transaction sold to a buyer (exclusive or multiple) that wants to buy from many generators simultaneously
4) Data transfer of ownership transaction allowing a new owner to have license granting rights to all data published from a data generator d) Security and Reliability Using a commercially available and well-established blockchain provider, such as Ethereum, and a platform configured for the distributed application 38, transactions can be implemented securely and reliably. It is understood that any blockchain provider, such as a private or forked version of Ethereum, Stellar, Bitcoin, or other blockchain can be a suitable replacement for Ethereum and that Ethereum represents one of many forms of blockchain. By integrating with a blockchain network 32, the application 38 becomes decentralized, meaning that no central authority or entity has the power to disable or control the application 38, and transactions are immutable. This provides a clear history and audit trail for licenses and ownership of the data 20.

Returning to the traffic infrastructure example. For a data generator 22 that has collected data through its products on behalf of customers over periods of time, derivative data that has been generated, including large samples of "golden" (i.e. verified or substantially guaranteed to be accurate) datasets (vehicles, classifications, annotated scenes etc.) useful as ground truth for the development of artificial learning algorithms, can also be submitted to the distributed application 38 for resale.

On behalf of their customers and with any required permissions, such an entity may facilitate the use of the distributed application 38, with the collected data 20 from traffic studies being performed every day. This can include road volumes, turning movements, travel time, classifications, license plates, etc. Likewise, historical and live data from intersections can all be submitted to the distributed application, where it may be licensed by data consumers 10. Moreover, a city, region or other entity may leverage the installed data generating equipment as a new revenue source. This traffic example is only illustrative, and any and all data generated from a city's or other entity's infrastructure (or data generating systems) can be submitted to the distributed application 38.

Figure 5:
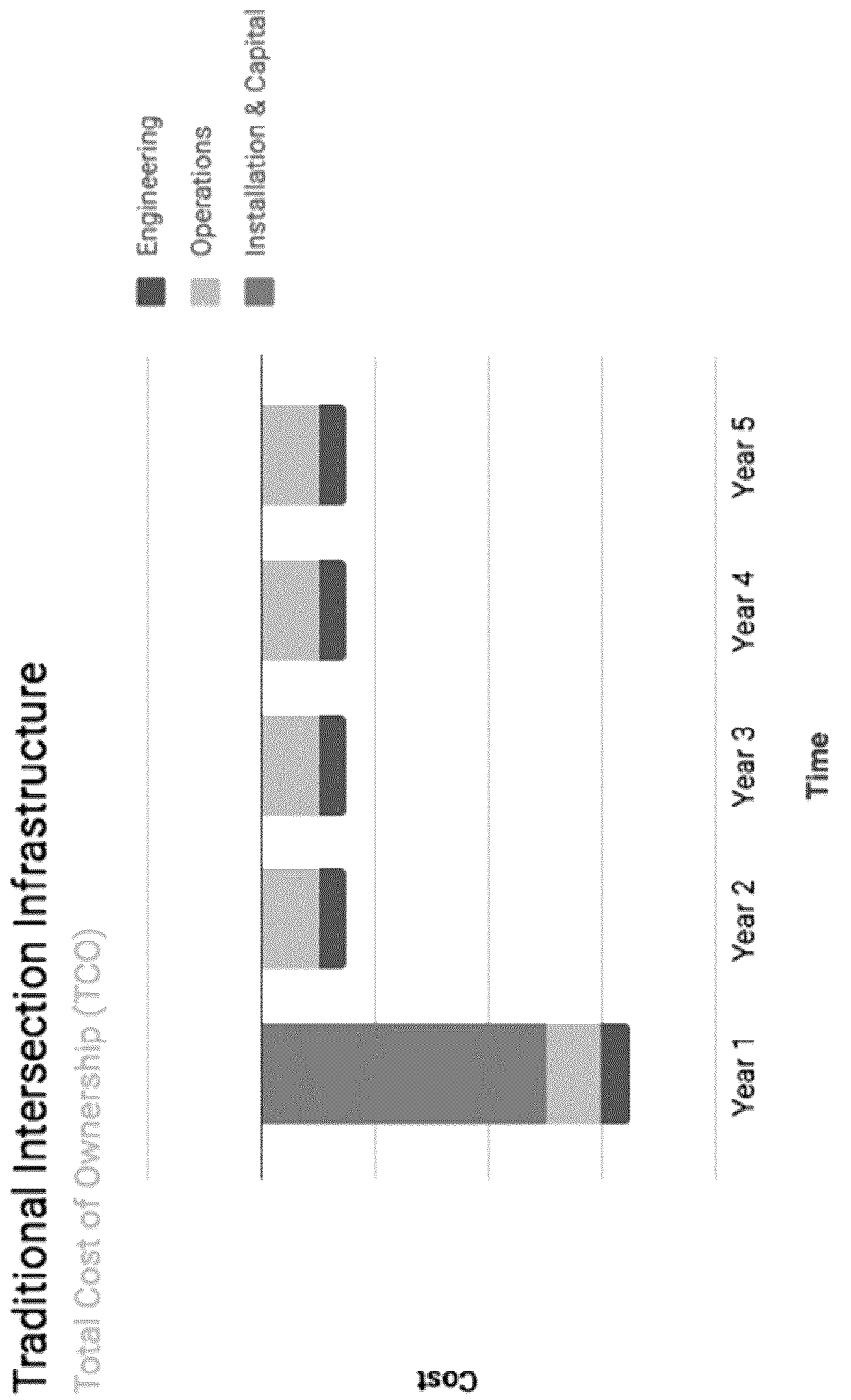
FIG. 5 is a chart illustrating representative traffic intersection infrastructure costs.

Turning now to FIG. 5, an overview of the economics related to traditional city infrastructure is provided. Considering a typical intersection, a simplified view of the costs over the first five years of ownership is shown. The cost of these traditional intersections follow what would be expected, namely: a significantly large capital expenditure in year one followed by yearly maintenance and operational costs for the life of the intersection. Now consider a purpose-built, modern, digital intersection capable of generating significantly more valuable data in a cost-effective manner. Using this infrastructure for new builds or "rip and replace" upgrades, a city may sell the generated data 20 through the protocol 34, and drive the infrastructure total cost of ownership to a minimum or even to zero.

Figure 6:
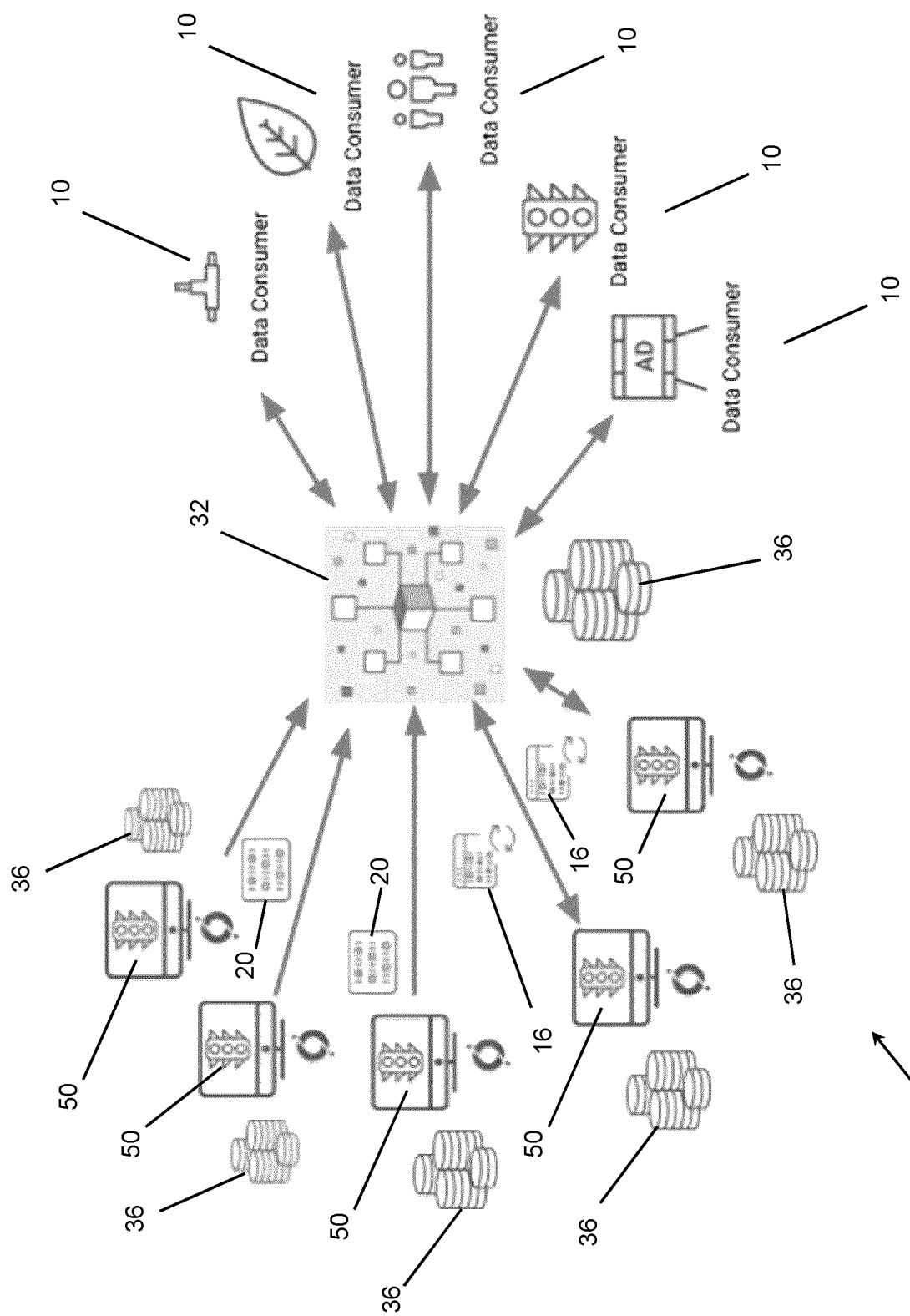
FIG. 6 is a schematic diagram of a blockchain-based network with data being generated by a number of digital intersections.

This approach encourages further investment into data generating infrastructure and adoption of the distributed application 38. For example, cities may now be able to afford, or at minimum subsidize, the costs of modernizing their infrastructure. To this end, a digital intersection infrastructure and devices operating within that digital infrastructure, are capable of providing the functionality of generating and delivering data to the distributed application 38. An example of such a digital intersection can be found in PCT Patent Application No. PCT/CA2019/050215 filed on Feb. 21, 2019 and entitled "System and Method for Providing a Digital Intersection", the contents of which are incorporated herein by reference. FIG. 6 illustrates an adaptation of the system 30 in which digital intersections 50 generate and feed data into the network 32, which can be consumed by various data consumers 10.

Figure 7:
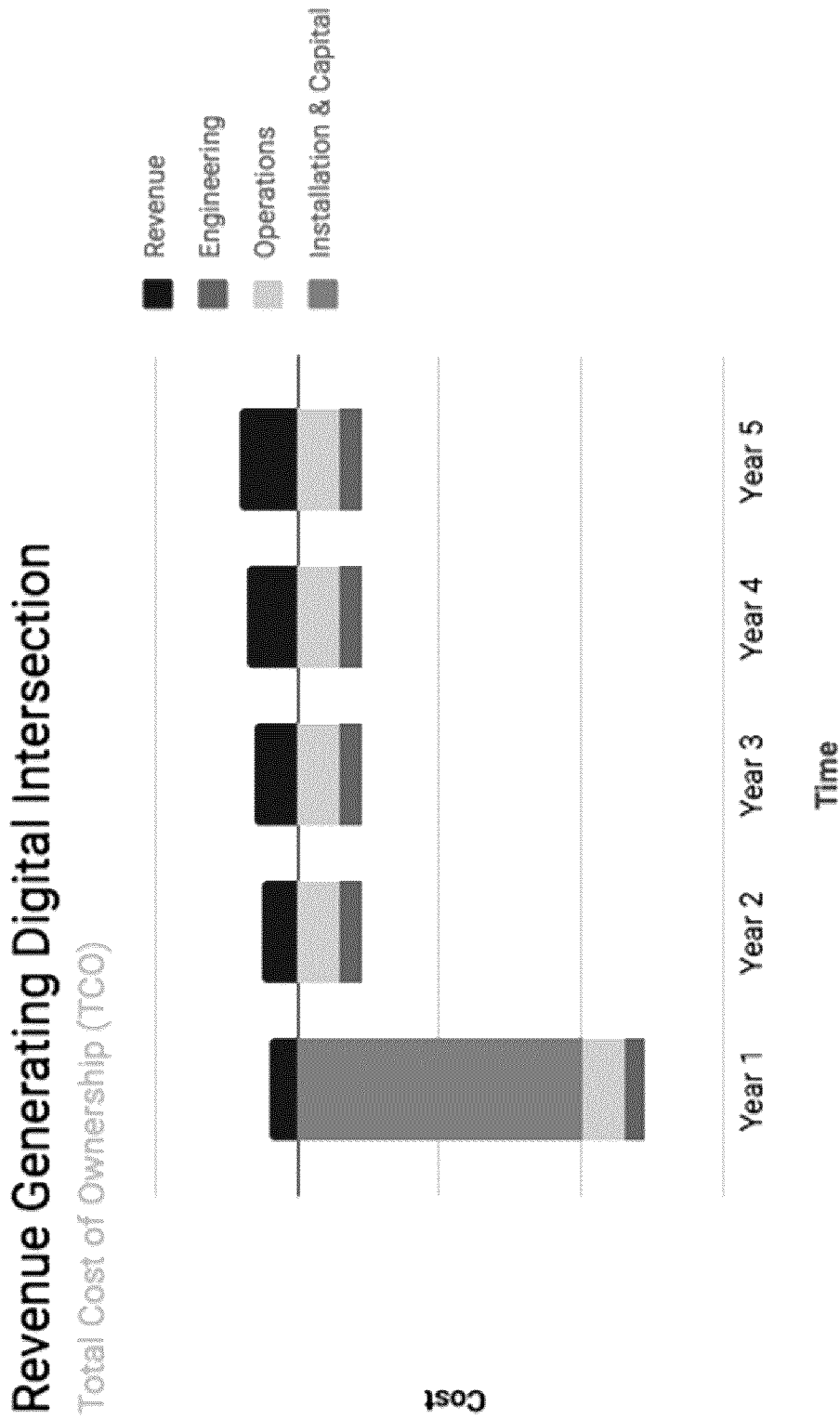
FIG. 7 is a chart illustrating representative traffic intersection infrastructure costs offset by forecasted data transaction revenue.

In a conservative estimate, the economics of a digital intersection 50 providing data 20 to the distributed application 38 are shown by way of example in FIG. 7. In this estimate, revenue can be generated from the outset, and over time can offset both the initial installation and capital, as well as the ongoing operations and engineering costs. As more and more data 20 are generated over time and, depending on the nature of the data being collected, it can be appreciated that such revenue could completely offset the costs and even become a revenue positive asset.

Figure 8:
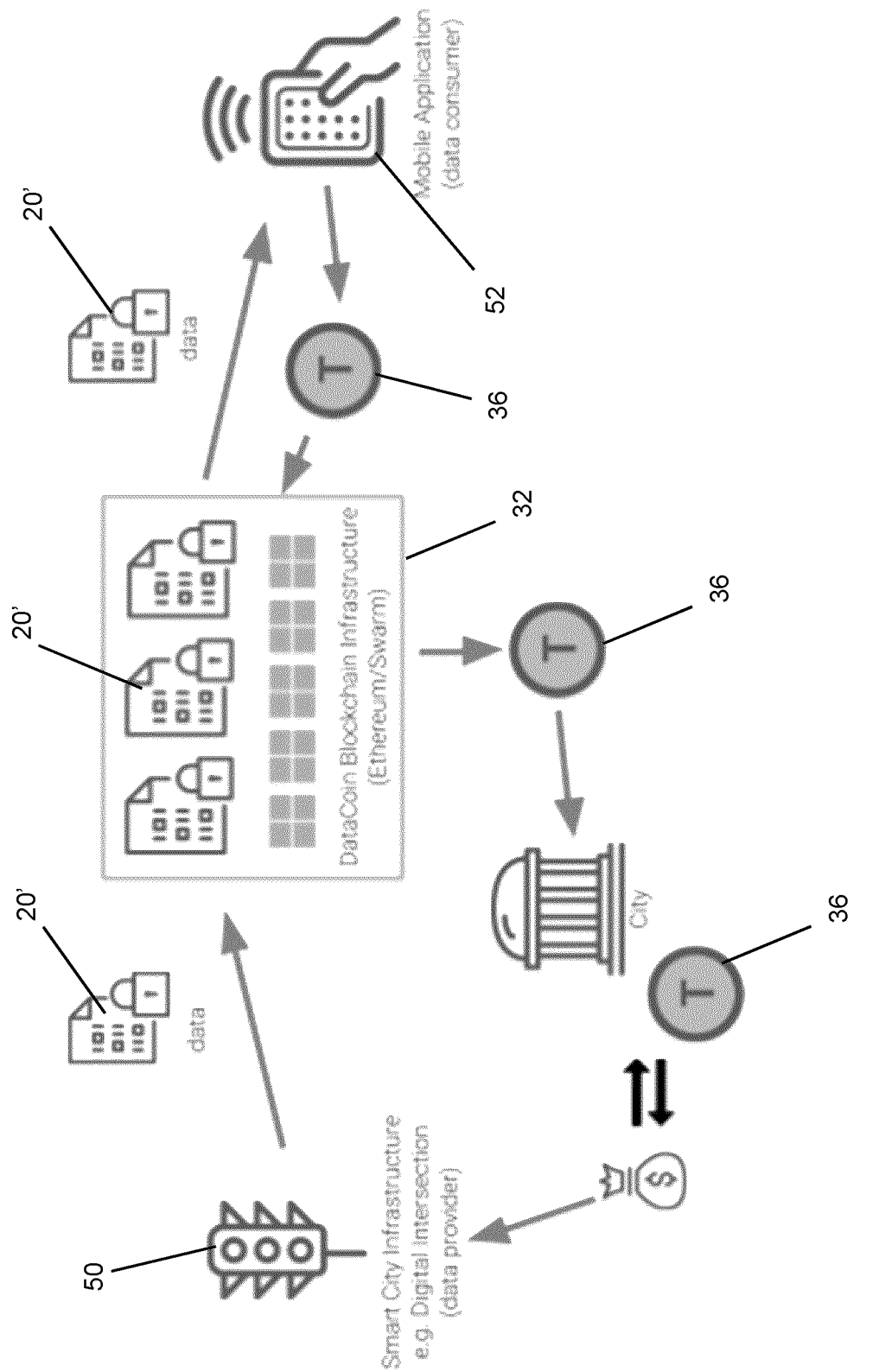
FIG. 8 is a schematic diagram of a data flow and value exchange for a revenue generating infrastructure.

FIG. 8 provides an illustration of the data flow and value exchange of revenue generating infrastructure. In this example data flow, a digital intersection 50 generates data 20, in this case encrypted or otherwise protected data 20', that enters the network 32. That data 20' is sold or licensed using the tokens 36, by a data consumer, e.g., via a mobile application 52. The token(s) 36 is/are provided to the owner of the digital intersection 50, namely the city in this example. The city can exchange the token(s) 36 for cash, in order to provide ongoing maintenance and/or other costs associated with that same intersection, and/or collect revenue that can offset the original costs. It can be appreciated that the cash can also be used to fund the upgrading or installation of other digital intersections 50. It can also be appreciated that, as discussed above, the data 20' may be stored elsewhere and not within the blockchain 32 such that the blockchain 32 instead stores a reference (e.g., pointer) to the data providing a record of its existence and its location for later access. For example, the blockchain 32 can store a mechanism that describes or provides access to an API or other interface along with "what" data (for example a given schema type and over a specified time), "where" and "how" to access the data itself via that interface. In this case the exchange would continue to execute a transaction, however could facilitate providing access credentials for a specified amount of data along with the license for this data in exchange for the agreed upon monetary or token value.

Figure 9:
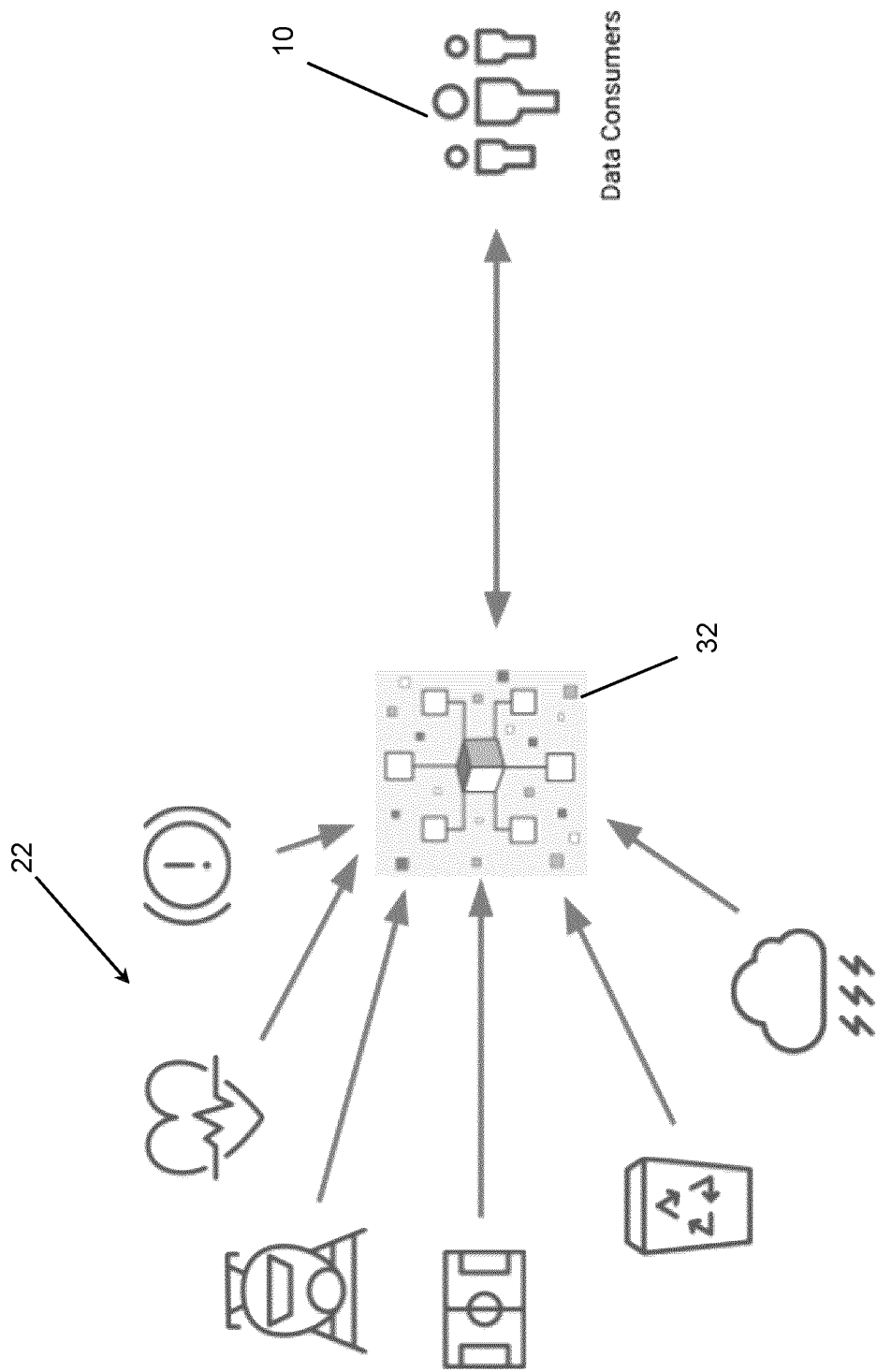
FIG. 9 is a schematic diagram of a blockchain-based network for conducting data transactions in which a number of different industries are participating.

The diagram in FIG. 9 outlines potential industries that could employ the protocol 34 and network 32 described herein. From emergency services, to healthcare, to waste management to weather services, data exchange can be used as a core part of operations in these fields and can enhance the data available to data consumers 10.

Figure 10:
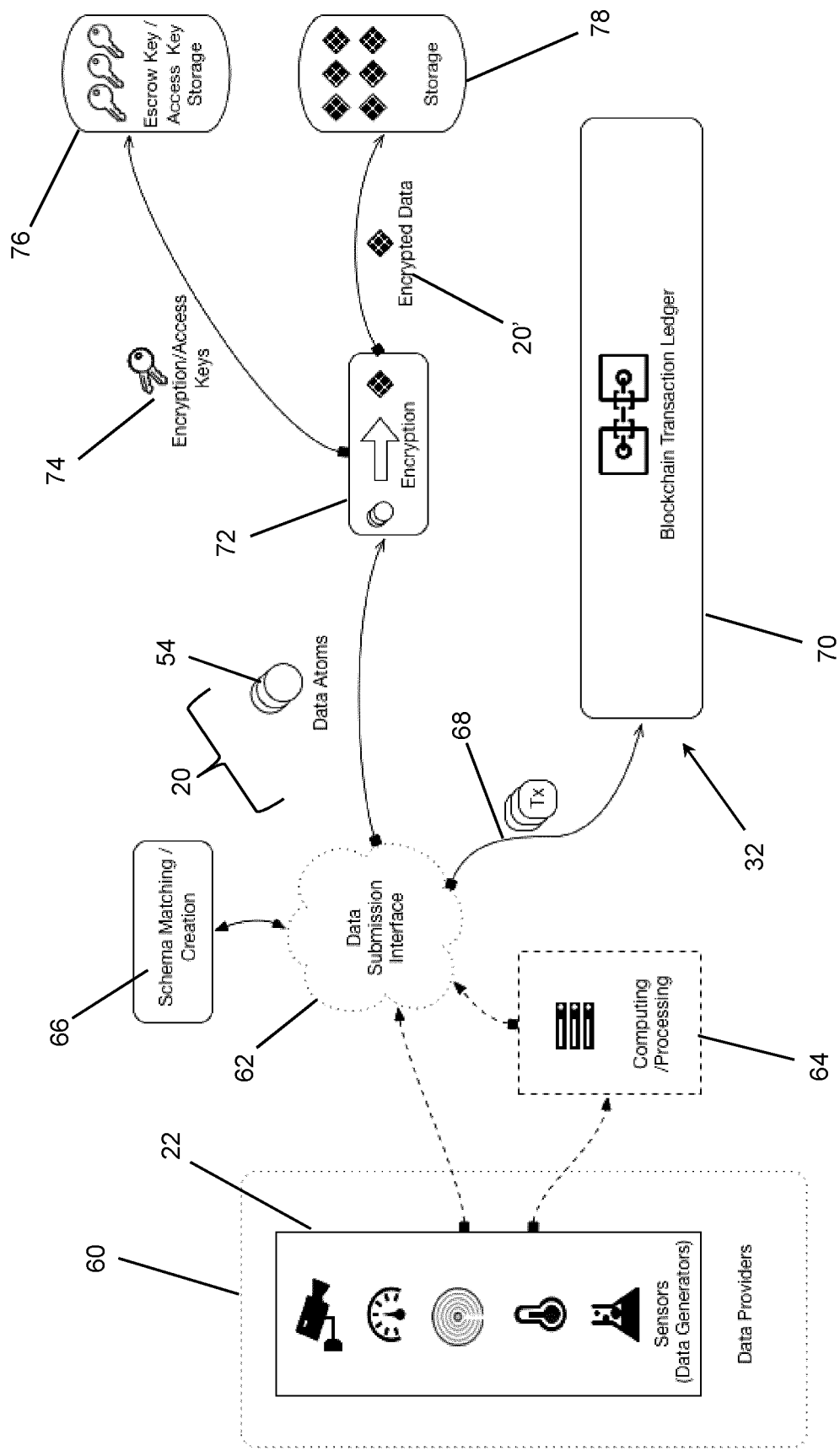
FIG. 10 is a schematic block diagram of a data submission process.

The following provides further detail of the operation of the system 30. FIG. 10 illustrates a data submission process. In this diagram, a data provider 60 is shown, which has or is responsible for operating a variety of sensors, corresponding to data generators 22. It can be appreciated that data 20 can also be generated from components/entities such as public libraries (borrowing trends/data), or from static data such as land registry data. These data generators 20 are shown to be submitting data 20 (or reference to such data 20) to a data submission interface (DSI) 62. The DSI 62 can be provided using any suitable wired or wireless interface, such as via a cellular or WiFi connection. As discussed above, the data generators 22 can be any device or software application capable of generating data 20 that can be submitted to (and/or referenced within) the network 32. A data provider 60 is considered the owner of the data generator 22 and therefore owns the data 20 generated from the device or application. Data generators 22 may send their data through an optional path via a computing/processing system 64 prior to submission to the DSI 62. This path allows for pre-processing and transformation of the raw data 20 (e.g. to generate processed data 16), before submission. The DSI 62 might be implemented as part of an embedded system, might be implemented as a process on a computer, or might be implemented in the cloud. As discussed above, they only need to be able to publish availability and a means to access data to the blockchain. It may be noted that computing or processing systems may act as data generators 22 without the use of sensors. It is possible for data to be purchased by data generators 22 allowing the data generators to conduct analyses and publish a higher-level data on the network 32, using the purchased data or other data through methods like data fusion, statistical analysis, or machine learning.

The data 20 (or reference(s) to the data 20) being submitted to the system 30 should conform to a defined schema. Schemas define the various fields that make up the data contents and the scope of the smallest transactable element of data known as a data 'atom' 54 herein. For example, traffic data 20 may include a location, time range, vehicle counts, vehicle classifications, movement direction, etc.

The user may select a schema or, if implemented, allow the DSI 62 to attempt to find a match from previously created schemas using a schema matching/creation module 66. That is, preferably a given schema is used, but a new schema can be created if one does not exist via a schema design process discussed in greater detail below. Such new schemas can be manually crafted, or generated from the data. In other implementations, a data lake approach can instead be used, wherein unstructured data is collected and stored. In other embodiments, the data 20 may be submitted without a schema or may have a simple schema containing keywords that can describe the data contained rather than a strictly enforced schema. In some cases, the schema might be highly general, indicating that the data is simply a JSON file, or a CSV file for instance. Many data generators 22 will find it advantageous to continuously send a single schema of data 20 and, as such, the schema process would only need to be configured once.

Once a schema is selected, in this example the data 20 is sent to the DSI 62 to be persisted in a storage module 78. It is preferable, but not required, that this communication be encrypted using any form of public-key or symmetric-key encryption function 72 (or any other suitable existing cryptographic scheme or protocol) available or across a virtual private network (VPN). This can include the exchange of encryption keys or access keys 74 and use of an escrow key storage device or service 76. Additionally, the data itself may be encrypted in storage 78, and digitally signed to ensure the integrity of the data 20 and the identity of the provider (generator 22 and/or provider 60). In the case of a data stream, a similar encryption/access key exchange can be used to grant access and protect the stream from unlicensed access. The storage module 78 may be comprised of any data storing system including for example a distributed storage network, a centralized cloud-based storage system, or local storage such as magnetic disks or flash memory. For example, the storage module 78 can be provided by the data provider 60 such that the blockchain network 32 is used only for storing a reference to the data 20 in the blockchain transaction ledger 70.

The owner of data registers the existence and ownership on the blockchain ledger 70 to enable discovery and license assignment. Upon reception of each atom of data, a record of the submission is stored as a transaction 68 on the blockchain network 32 in the blockchain ledger 70. Data submissions provide a reliable and immutable assignment of ownership rights of the data 20 to the data provider 22, 60. Only the record of submission is stored in the blockchain ledger 70, since the data 20 has already been persisted to the storage module or is provided external to the system 78. A reference to the location within the storage module 78 can also be stored if necessary to enable the data 20 to be retrieved at a later time, as discussed above.

One storage solution can be to utilize existing SWARM storage. SWARM allows the user to freely store raw data, but charges fees to people accessing the data. Further, it implements "insurance" allowing the owner to pay the SWARM storage owner to keep their data around instead of having the SWARM storage remove the data if it is non-profitable.

Other storage solutions can leverage Amazon Web Services (AWS) or other cloud-based solutions. A simple storage API can be implemented around both AWS and SWARM to ensure proper licensing is obtained before data is accessible to the user. This might take the form of only storing encrypted data in storage and sharing the decryption keys with the buyer or by integrating a licensing layer that unique encrypts data stored in AWS or SWARM specifically for the individual user. As part of the storage API, both the user and storage provider are able to store records of successful or unsuccessful transactions on the blockchain allowing future users to determine who is trustworthy and how many transactions have been fulfilled.

For validation of both users and providers, a "trusted buyer"/"trusted entity" mechanism can be introduced enabling an account, trusted by a large number of Open City Token holders, to be recognized. This mechanism offers less resistance to all parties when trusted entities are participating in transactions.

Figure 15:
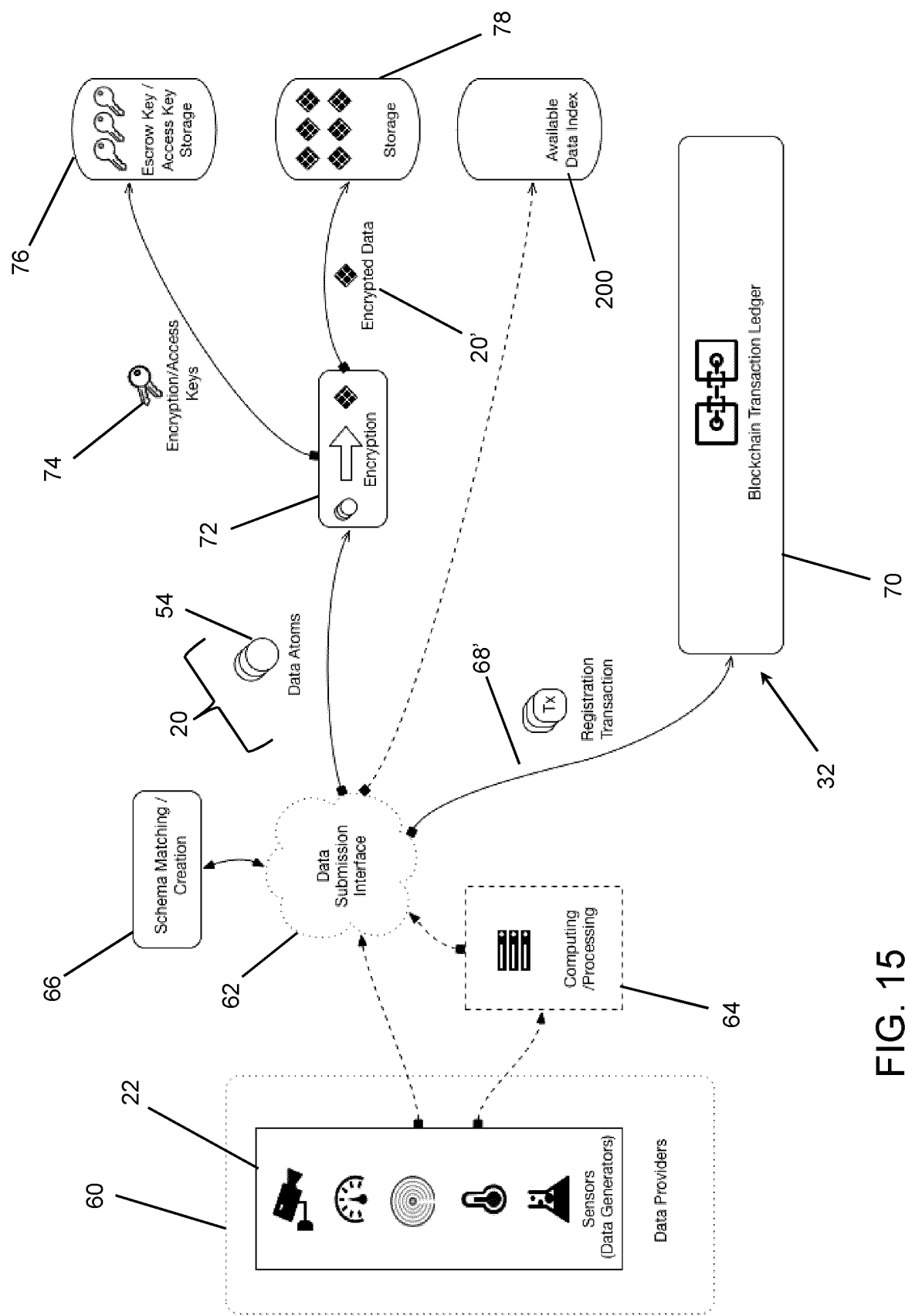
FIG. 15 is an alternative blockchain implementation.

FIG. 15 shows an alternative embodiment. Although the diagram is very similar, the function of the DSI and the blockchain transactions are very different. In this case, data generators "register" on the network as a data provider, indicating it's presence, location, schema(s), active periods (if known) and any other relevant identification data via the DSI. This registration 68' is stored as a transaction in the blockchain. The distributed app 38 provides storage access (via API, or alternate interface) as a location to submit data or to provide a data stream. The record of transmission of this data, groupings of data or atoms are not stored on the blockchain as was done in the previous embodiment. The generator is 'trusted' to be providing the data indicated to the DSI (upon registration) and verified when the data is subsequently requested. In the case of a data stream, the stream is expected to begin and end as configured in the DSI at the endpoint provided by the application. As before, encryption or access keys to the available data are generated and stored to be given to consumers when the data or streams are purchased. In this diagram an optional data index 200 is also shown. This index 200 can be used to support data discovery by including details of available data or future available data that aren't captured in the registration transaction. It should also be noted that this data index 200 may also be used in the previously-described embodiment.

Requests or purchases of this data generators data follow a similar pattern as in the previously-described embodiment. The data consumer initiates a transaction for any historical or future (typically streamed) data that is desired. At this time the application dynamically creates the data atoms 54 comprising the set of data 20 requested. If the data 20 is entirely historical, it is made available for download in the same way as the previous example with the exception that the entire dataset is considered a single atom 54. If the data 20 is entirely in the future (for example, a traffic turning movement count at an intersection 6 months from now), the atom 54 will comprise this entire future set of data 20. The purchase transaction is recorded on the blockchain ledger 70 and provides access to the stream of data, in real-time, when it becomes available. If the requested atom 54 spans both historical and future data 20, the historical data 20 is made available as was done previously and the stream of live/future data is immediately made available. Access to the streaming data 20 may take a variety forms but will typically be a set of API keys or credentials that will unlock access to the stream. In all cases, funds can be held in escrow and released incrementally to the provider as data is delivered to the purchaser. Alternatively, the entire balance of the transaction may be held until the entire balance of data 20 has been provided. If multiple providers' data 20 make up the set of requested data 20, the application 38 can provide payment proportionally to the value of the purchased data 20 to the data generators 22 or data providers 60. Each of these payments would be recorded as transactions on the blockchain ledger 70.

If any future data 20 or streams are unavailable and do not become available from the provider, the funds held in escrow allocated to the missing data can be returned to the purchaser.

As a result of the above approach, significantly fewer transactions will be logged on the blockchain ledger 70, thus improving the performance and scalability of the entire system.

Figure 11:
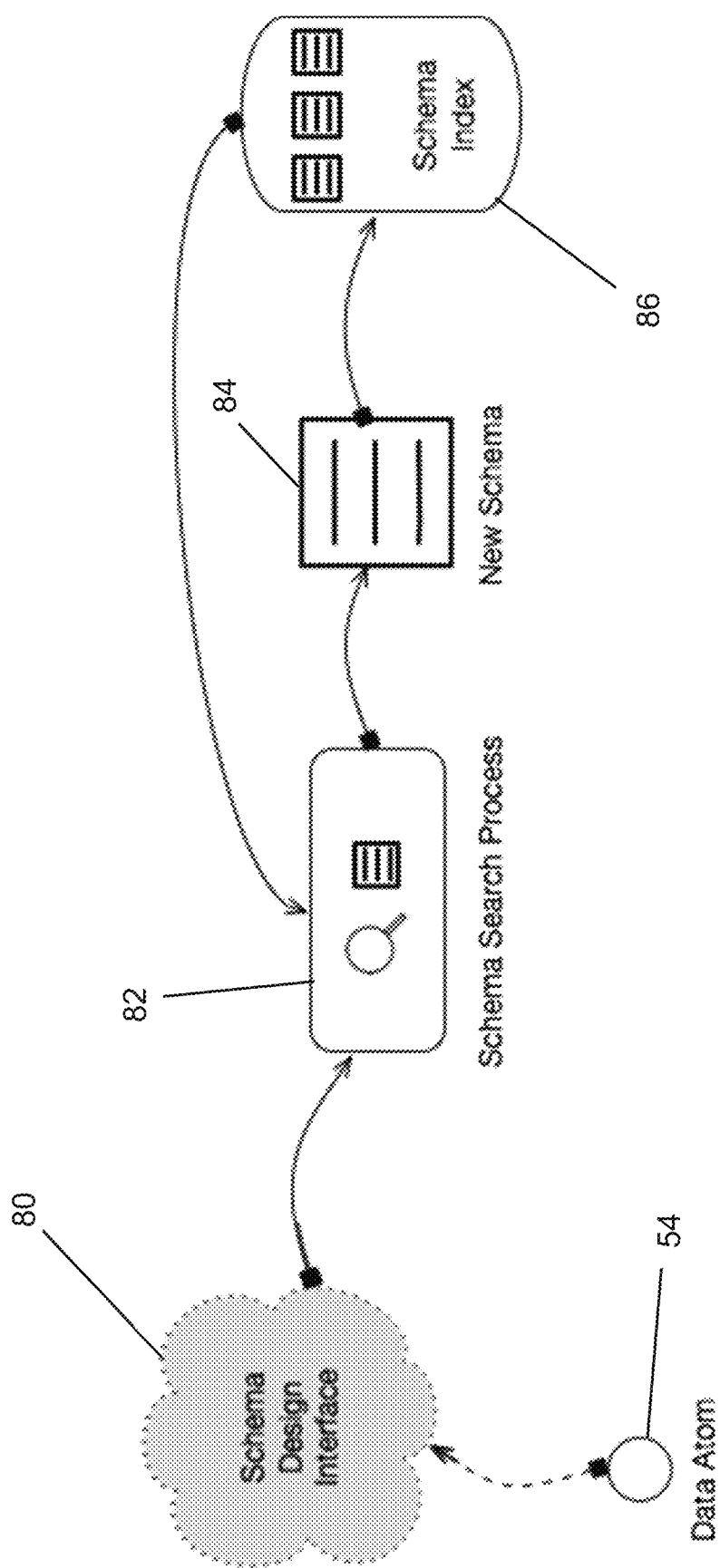
FIG. 11 is a schematic block diagram of a schema addition process.

FIG. 11 shows a process flow for adding schemas to the system 30. It can be appreciated that the process shown in FIG. 11 is illustrative, and alternative methods of adding schemas (including batch processing of a large quantity of existing schemas) may be utilized. In the example shown in FIG. 11, a data atom 54 may be submitted to a schema design interface 80, and the fields comprising the data 20 are extracted to create a suggested schema. These extracted fields can be modified to appropriately reflect the desired schema. Alternatively, all of the fields can be entered manually as the desired schema, by any interested party. Once accepted, a schema search process 82 can be used to search the existing schema index 86, to ensure a duplicate schema does not exist. If a duplicate is found, a notice will be reported back to the user. If no duplicates are found, a new schema 84 is stored and made available for future data submissions.

Figure 12:
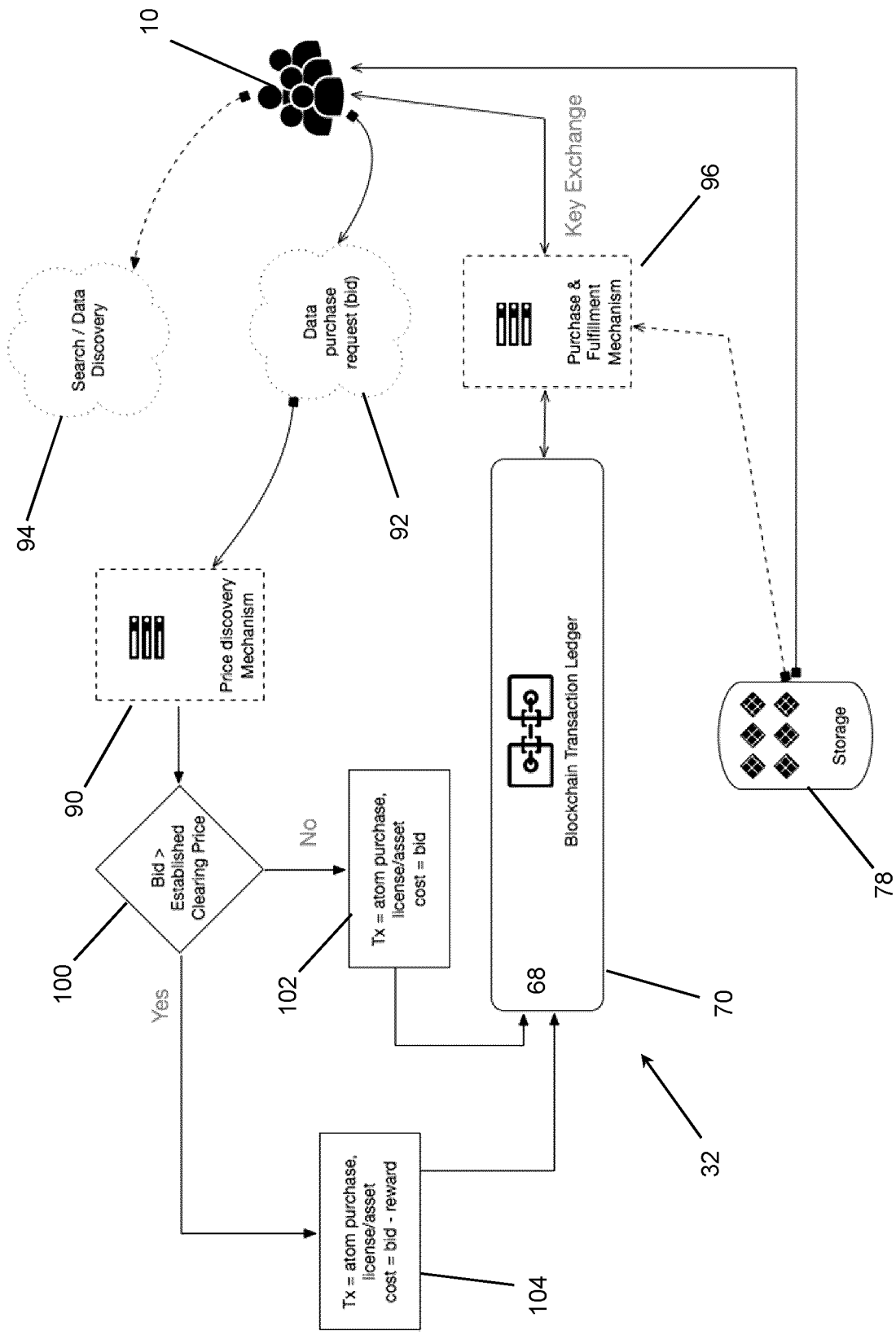
FIG. 12 is a schematic block diagram of a data purchase transaction process.
Figure 13A:
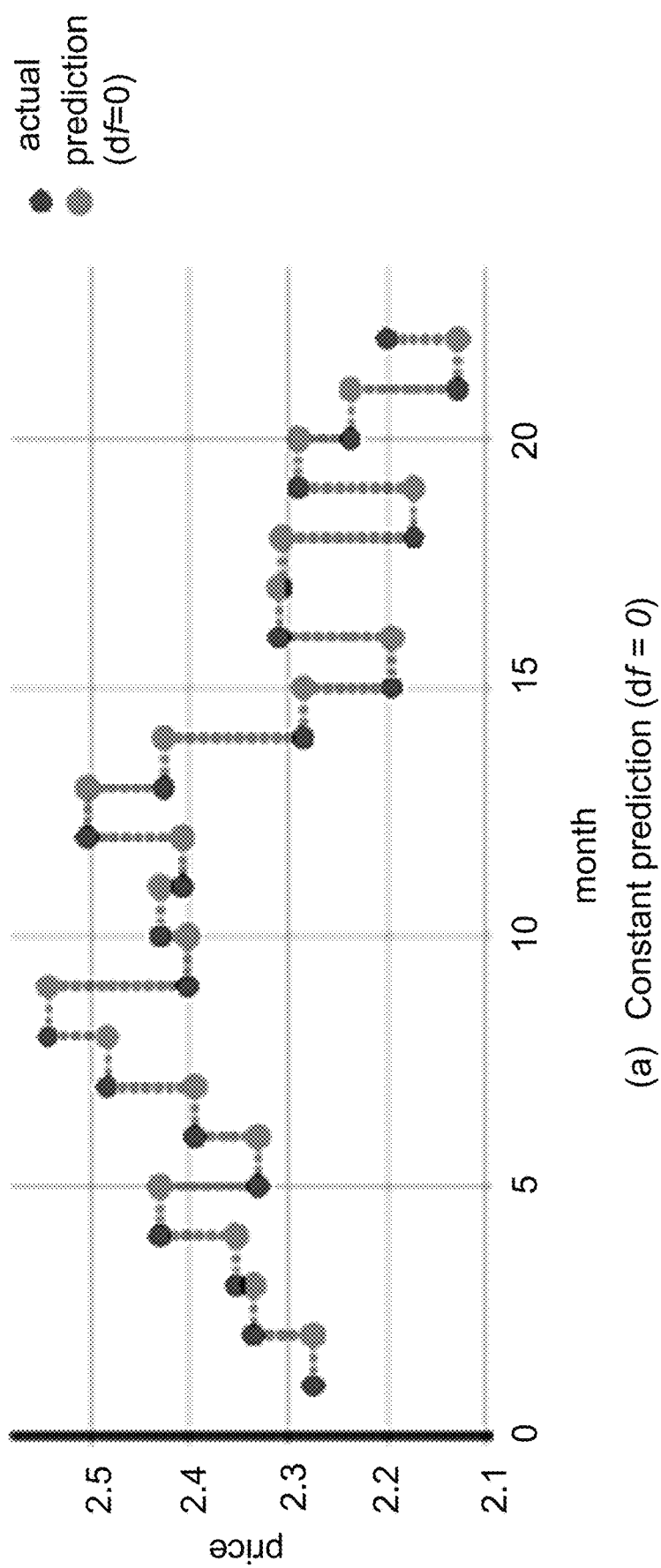
FIGS. 13(a) to 13(c) are graphs showing prediction trends and error applied to real-world data.
Figure 13B:
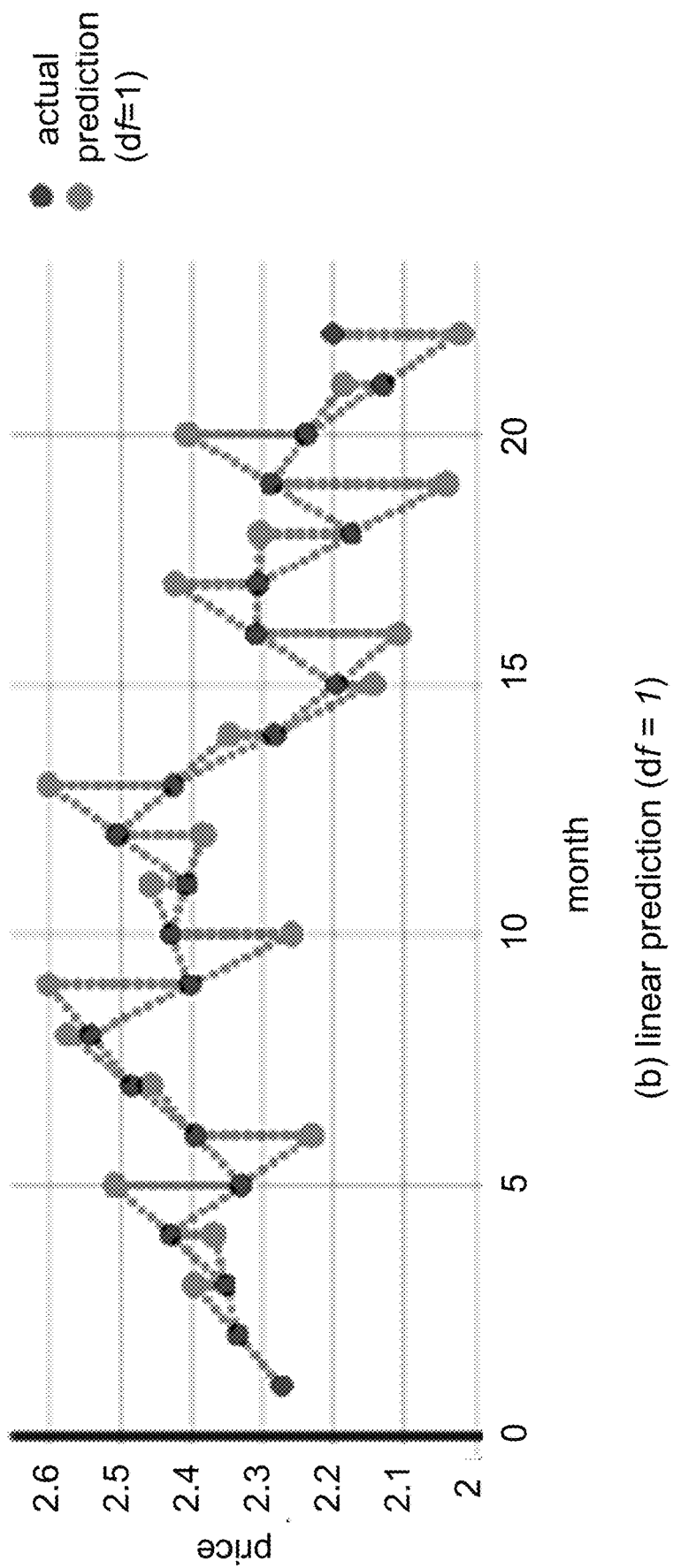
Figure 13C:
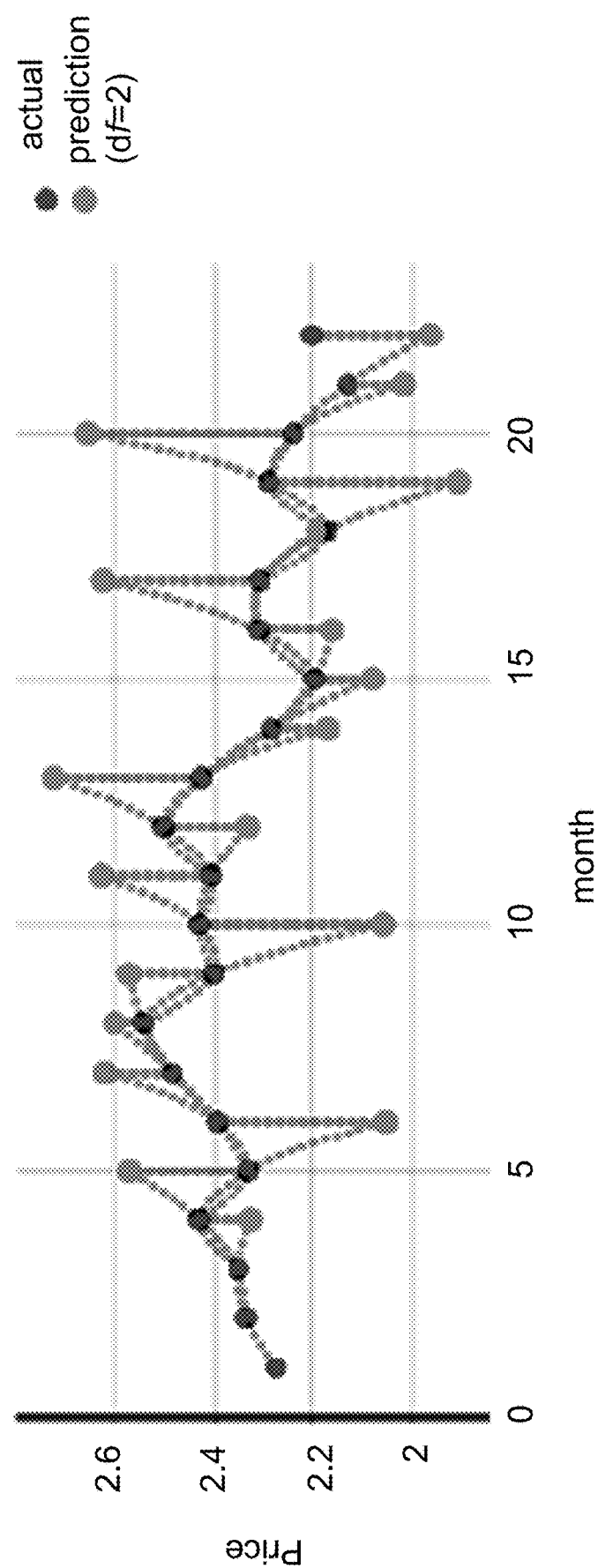
Figure 14A:
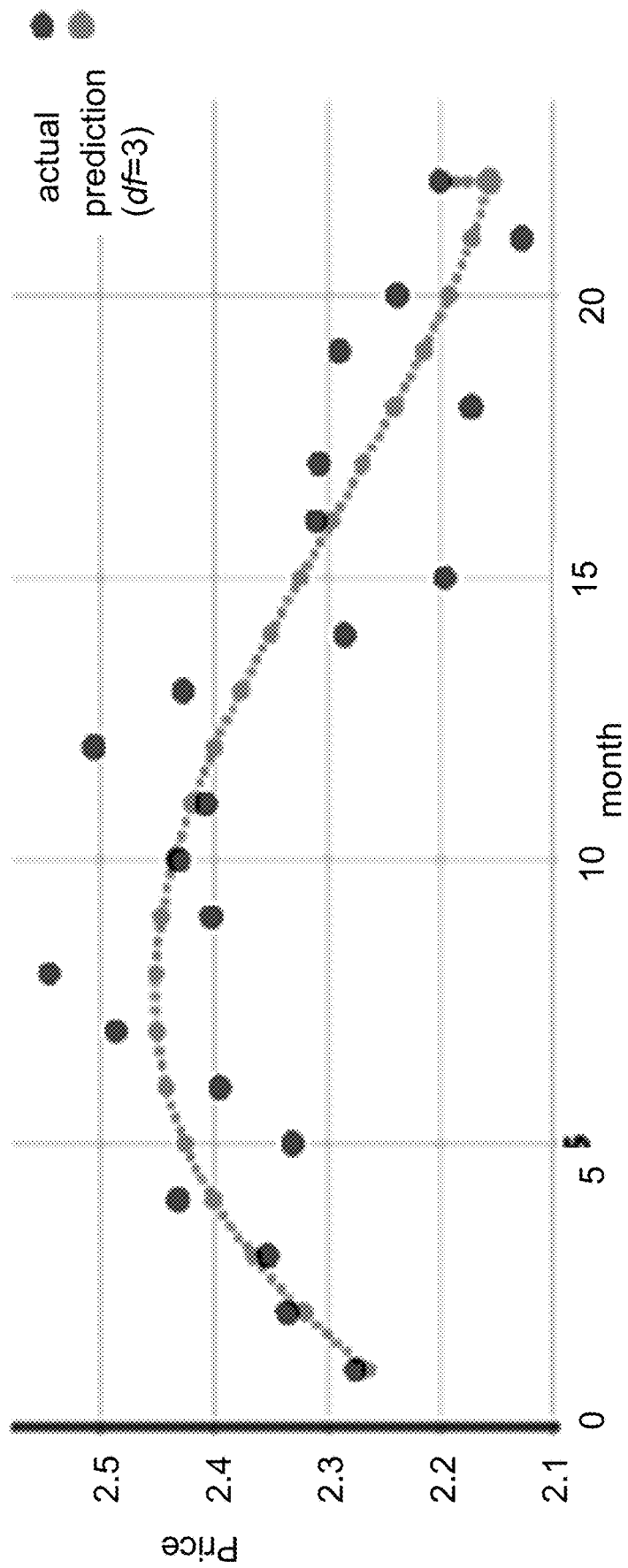
FIGS. 14(a) to 14(c) are graphs showing least squares polynomial fitting.
Figure 14B:
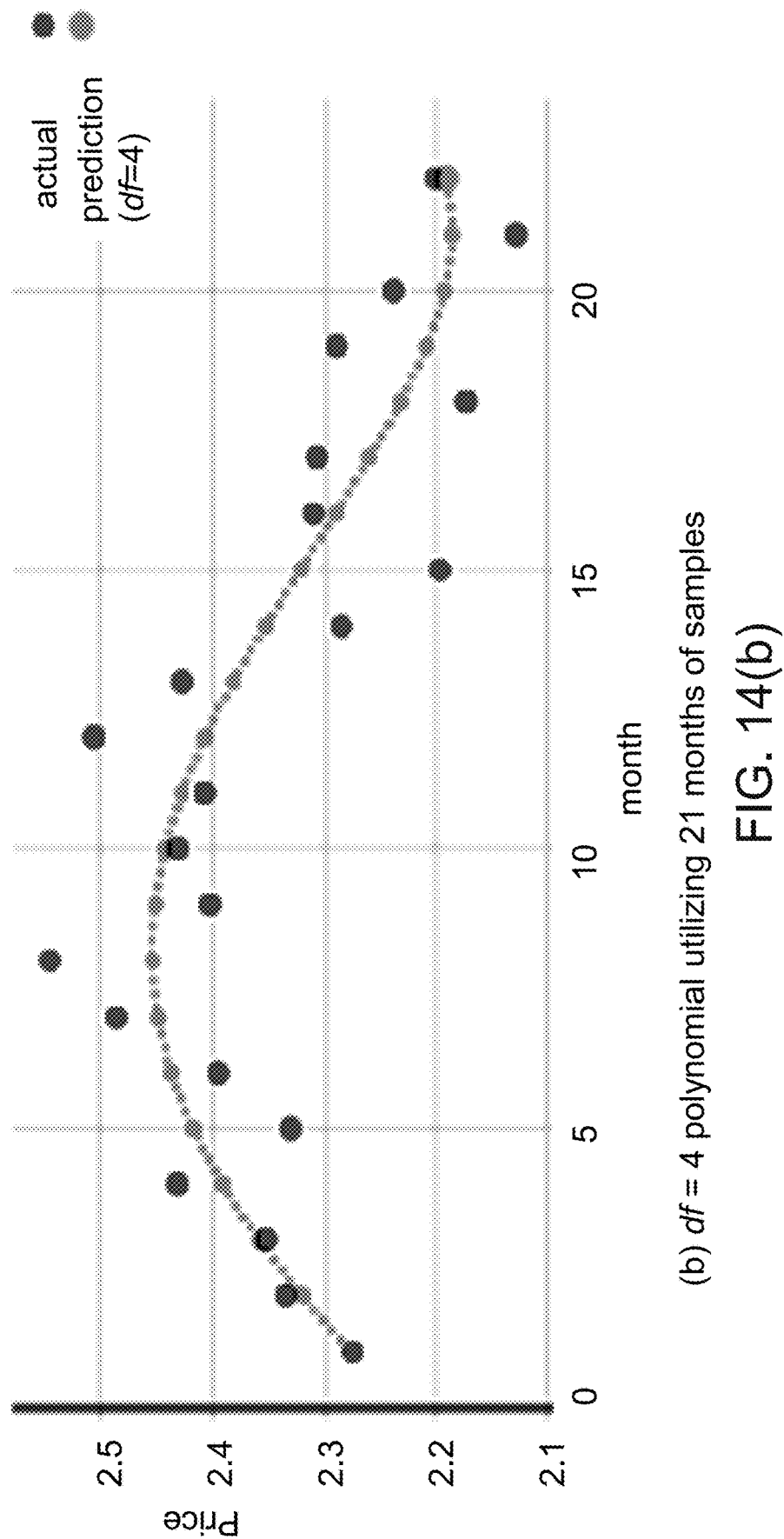
Figure 14C:
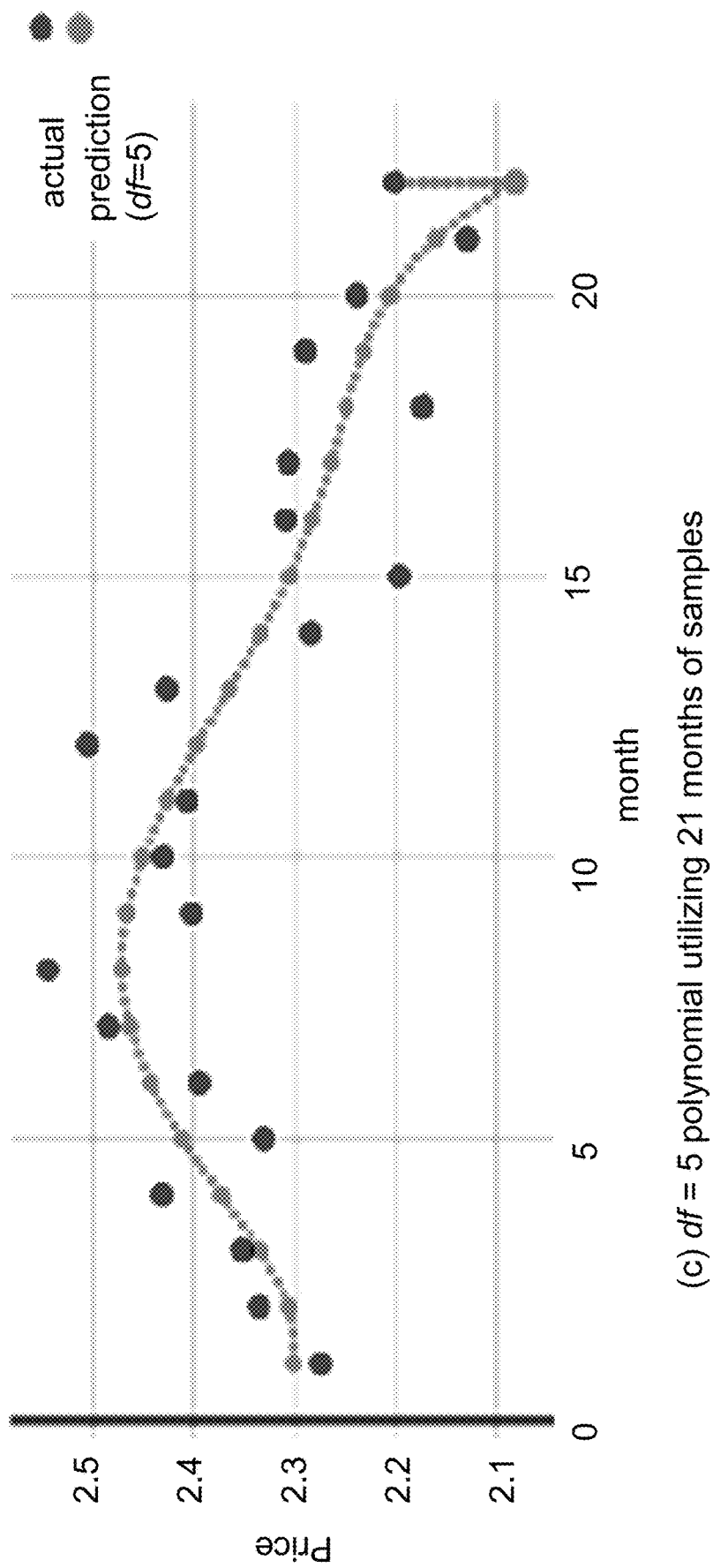

Using the transaction records 68 in the blockchain ledger 70, an index and description of data stored in the network are available, e.g., by scraping the data in the blockchain ledger 70 and implementing a search engine using that data (see block 94 in FIG. 12). This index can be used as a data discovery mechanism 92 for data consumers to identify data that is of interest to them. Parties may consume and package the transaction records 68 to provide improved data discovery services, similar to how search engine companies index the world wide web to provide searching capabilities on the Internet. Discovery services 92 provide a mechanism for data consumers 10 to become aware of the available data 20 that has been submitted to the blockchain network 32.

FIG. 12 illustrates a data purchase transaction process using a bidding and price discovery mechanism 90. In this example, data consumers 10 can place a bids on an atom 54 or atoms 54 of data 20 that they are interested in purchasing or licensing (otherwise getting access to). The atoms 54 can also be part of an underlying data stream, allowing a single bid for the collection. For example, the consumer 10 may have used a search/data discovery interface 94 to identify such atoms 54 of data 20. The data consumer 10 can then access a data purchase request (or bid) interface 92, and a "bidding cycle" can be created where bids for data are collected for a period of time before a new clearing price is established. The price discovery system 90 is used to determine the clearing price that maximizes revenue for each atom 54 of data 20 being requested. It can be appreciated that the price discovery system 90 can be selected from a variety of price discovery systems (PDSs) 90 designed to drive desired economic outcomes. For example, PDSs 90 can be designed to approach maximum revenue for the generators, approach maximum transaction volume etc. Additionally, a completely alternative mechanism for price setting can be used such as set pricing by the data generator 22 without any bidding process. Alternatively, other price setting systems may be used such as first price sealed auctions, second price sealed auctions, open ascending, open descending, reserve auctions, and even fixed prices etc.

Continuing with the example shown in FIG. 12, once a clearing price is established, the bidders who have met the clearing price will then complete the purchase. The total cost of the data 20 is a combination of the clearing price, any additional fees paid, and any rewards given to the buyer depending on the implementation of the network and PDS 90. In this case, a transaction 68 is recorded in the blockchain ledger 70 that identifies the date/time of the purchase, the atom 54 of data purchased, the owner of the data 20, the purchaser of the data, the price of the data, the data use license, the location of the data, and any other necessary information related to the transaction 68.

As shown in FIG. 12, the price discovery mechanism 90 determines at step 100 if the bid is greater than the established clearing price. If not, at step 102 the transaction 68 is equal to the atom purchase and the license asset, with the cost equaling the bid. If the bid is greater than the established clearing price, at step 104 the transaction 68 is equal to the atom purchase, the license/asset, and the cost is equal to the bid minus the reward.

This transaction 68 is recorded in the blockchain ledger 70 and provides persistent proof of rights to the data 20 as defined by the atom's license agreement. Bidders not reaching the clearing price may still incur transaction or other fees as defined by the implementation.

In addition to purchasing licenses to the data atoms 54, a buyer may bid on the data asset itself rather than only a license to use the data 20. In this case, the atom's ownership rights are transferred to the buyer. Any subsequent data license purchases of the atom would benefit the new owner.

Likewise, a generator may sell ownership of all future generated data assets for a period of time, or the life of the generator.

Depending on the implementation, a separate mechanism of exchanging decryption keys can be carried out so that the purchaser of the data 20 is able to access the data 20 (e.g., trusted escrow, Diffie-Hellman key exchange, x25519-xsalsa20-poly1305—public/private key to generate a secret that is used to encrypt/decrypt data). The purchaser of the data 20 can obtain licensed data by contacting the storage provider(s) for the data and following a workflow to ensure that the storage provider receives payment and that the data is securely delivered via existing cryptography methods. The transfer of data is also recorded on the blockchain and verified by the buyer allowing other agents to quantify trust in the data owner, data storage provider, and buyer. Appendix A, "Atom Storage" provides a set of functions via blockchain Smart Contract that implements an example of this workflow. Also depending on implementation, the purchaser may now access and download the encrypted data 20 from the network's storage or referenced storage location 70. Applying the decryption key to the encrypted data 20' reveals the purchased data 20 for use within the license terms of the transaction 68.

In the case of access to a data stream, a typical license can grant access to the stream for a specific period of time. In this case, the stream provider may be required to provide access information to the purchaser via the transaction process or an offline process. The data stream provider would then be responsible for ensuring access and ongoing delivery of the data 20 as promised in terms set out in the data license. For example, the owner of the data 20 can create a trusted delegate to resolve the clearing price and issue licenses on behalf of the data 20. In another implementation, a generator can pick from a list of predefined license terms that fit most applications and/or have the ability to submit their own license terms with the data 20. All atoms 54 (or sets of atoms 54) using that license may include the license as part of the data payload when it is retrieved, or the interface can require the buyer to accept the terms of the license prior to data retrieval.

Price Discovery

As indicated above, a price discovery mechanism (PDS) 90 can be used to achieve a specific objective, for example to maximize the overall market revenue. The following describes a non-limiting example of a proposed PDS 90 that attempts to find a clearing price surface and the associated volume. It can be appreciated that other example solutions could also be implemented. The goal of the method in this example, is to eliminate the need for data providers (sellers) to participate in the price discovery process while maximizing the revenue generated from their data 90.

The mechanism 90 attempts to get the buyer to disclose the maximum price they are prepared to pay, $\widehat{p_b}$. If $\widehat{p_b}$ can be determined, a clearing price, $p_c$, that maximizes $\Pi$ for n buyers can be determined.

To motivate buyers to bid honestly, for each bid, $p_b$, the buyer is forced to pay the price of a transaction fee, flu, but also has the opportunity to be paid a reward, $p_r$, if the bid wins the purchase. Thus, incorporating the clearing price, $p_c$, the buyer will pay, $p_d$, $$p_d = \begin{cases} p_{tx} - p_c - p_r, & \text{if } p_b \geq p_c \\ p_{tx} & \text{else,} \end{cases}$$

If the buyer wishes to purchase the data, there is a motivation for the buyer to both bid as low as possible, min $p_b$, but also to win the bid to avoid fees $p_b$, from multiple bids.

Setting a constant $P_{tx}$ may not be a selected strategy. To encourage signaling, having $P_{tx}$ initially set to zero for each buyer, then incremented individually as each buyer bids until the buyer wins, can be used as an alternative approach. While this helps honest buyers pull down market prices to purchasable levels, dishonest buyers are given the same advantage. Further, if the system has anonymous agents, they may create dummy accounts to spam the network with new buyers. One way to prevent spamming is to initialize $P_{tx}$ according to the stake each buyer has in the network 32. If the rational buyer has a large number of access tokens 36, they have higher stake in the network 32 and are less likely to distribute their tokens 36 to newly created dummy accounts that jeopardize their data marketplace. However, this does not protect the network 32 from an irrational or an unwitting buyer. Instead, verified buyers/verified entities, as previously described, ensure that each network 32 can be verified as legitimate people or companies by sharing documentation with the Open City Foundation or other trusted entities.

There are circumstances where buyers wish to obtain data that does not yet exist in the system 32. In the same way that buyers can submit a low bid, to signal desire or need to pay less than $P_c$, buyers can submit a bid for new types of information. Essentially, the buyer would initiate an auction for the new specification: data schema, desired location, desired time-of-day, and any combination of the former with any other desired property. Then the buyer would specify their bid as a participant in the auction.

Without data that fulfills the specification, the open bid will go unfilled and at the end of the bidding period both $P_b$ is returned to the buyer. The fee $P_{tx}$ would not be returned to ensure that the potential buyer does not spam the market with numerous dishonest requests. Further, $P_{tx}$ can help guide the buyer to bid towards $\widehat{p_b}$. To attract data producers, $P_c$ should be sufficiently high. While the potential buyer might choose to bid below $\widehat{p_b}$, they take a risk that data producers will not fulfill the new data specification. They may even choose to bid higher than $\widehat{p_b}$ to initially attract producers, and then later reduce their bid once economies of scale allow data producers to provide data closer, or even below, $\widehat{p_b}$.

If data producers are able to fulfill the request within the bidding cycle, then they can clear all of the open bids and complete their transactions as above. As an additional reward for producing data 20 the producers can set the initial clearing price.

Potential buyers can specify desired volumes through multiple bids. To encourage multiple bids, $P_{tx}$ should be low. However, this contracts the use of $P_{tx}$ to discourage dishonest bids. As such, there may be a resolution that encourages buyers to create new data markets.

Data producers are encouraged to make data available for potential profit that would otherwise be collected and achieved only for internal purposes. By making their data 20 available, a larger community can benefit and the producer can capture revenue from secondary markets.

A minimal sale value can be set, and changed, to prevent the seller from taking a loss if $P_c$ is too low. To prevent these conditions from being known to the public, the seller can publish a hash and keep the barriers hidden, both from the potential buyers, as well as potential sellers. This will encourage buyers to bid honestly, and won't artificially lower perceived value if the seller prices incorrectly. This mechanism is commonly used in existing blockchain-based applications that implement blind auctions.

In the presently described network 32, one may desire to establish a price discovery mechanism 90 which does not require active participation from sellers, while still ensuring accurate price equilibrium will be reached. This property of the network 32 greatly simplifies adoption by sellers which is important to network proliferation. Given that buyers are self-interested parties, they are expected to always seek to achieve an economic outcome that is in their best interest, therefore one cannot rely solely on their bid price as a market price setting mechanism. Consequently, the system 30 may require a price setting mechanism that takes advantage of the buyer's inherent self-interest to achieve price equilibrium inherent in a traditional two-sided market. A proposed model to achieve this is as follows, $$P_d = P_c + P_r + P_{tx},$$

where $p_c$, the clearing price that would emerge a traditional two sided market, $p_r$ is a reward (described in more detail below) that the buyer receives for being honest about the fair value of the data in their bid, $p_{tx}$ is the transaction cost inherent with a given purchase attempt, or series of related attempts, before a clearing transaction occurs.

The model for $p_d$ is applied to each discrete unit of data, called an atom 54, as a means of determining $p_{\sigma,i}$. Each corresponding atom 54 contains its underlying data, d, position, ρ, schema, Y, time of generation, T and verification status, γ, $$A_i = (d_i, \rho_i, Y_i, \tau_i, \gamma_i)$$

The verification status suggests that the value of the data may increase knowing that the generator of the data has a "verified" status, given to the generator by a trusted body and/or through a crowd-sourced rating system.

Given the mathematical and computational complexity inherent with estimating this surface, the system 30 can opt to treat price discovery as an off-chain process.

One can define a Price Book as the current clearing price for all atoms 54 in the network 32, set as a function of ρ, Y, τ and γ. Price Books are updated at incremental time intervals. At each time interval, t, a Price Book, $E_t$, is generated which updates $E_{t-1}$. $E_t$ is selected from the set of Price Books that were submitted to the network 32 at t-2, { $\overline{E}_{t-2}$}, using the set of transactions which occurred in the network at time interval t-1, $K_{t-1}$. Each transaction in $K_{t-1}$, includes a record of which atom 54 was transacted, the bid price, the clearing price and the transaction fee, $k_{t-1,j} = (A_i, \overline{p}_{b,j}, \rho_{c,j}, \rho_{tx,j})$, where $K_t \in k_{i,j} \forall j$.

Each Price Book, $\overline{E}$, submitted for consideration in $\overline{E}_{t-2}$ can be thought of as an estimate of the true dynamic price surface representing the prices of the atoms 54 currently in the network 32, $\overline{E} = (A_i, \overline{p}_i) \forall i$. When time interval t-2 ceases, no new Price Books may be added to {$\overline{E}_{t-2}$}. This prevents any bad actors from adding a Price Book proposal to {$\overline{E}_{t-2}$} once transactions from the time interval t-1 have begun to occur. This property of the network 32 can be used to inhibit cheating. When time interval t-1 ceases, the network 32 calculates the revenue, $P_{t-1}$, that would have been generated by the network for each $\overline{E}$ in {$\overline{E}_{t-2}$} given the actual bid prices, $p_b$, in {$K_{t-1}$}. The Price Book that would have maximized the revenue for the network at t-1 is selected as the new Price Book, $E_t$.

To calculate $P_{e,t-1}$ for each Price Book in {$\overline{E}_{t-2}$} using each transaction $p_{b,j}$ in {$K_{t-1}$}, one can perform the following operation, $$P_e = \sum_{i,j} \overline{p}_{i,e} \mathcal{H}(\overline{p}_{b,j} \geq \overline{p}_{i,e}),$$

where, $$e^* = \arg_e \max P_e,$$

Recall that for each transaction $k_j$ there exists a bid price $\overline{p}_{b,j}$ and a clearing transaction price $p_{c,j}$ There are two ways that $p_{c,j}$ can be set for a given transaction. The first way is that a data buyer submits their $\overline{p}_{b,j}$ and when $E_t$ is computed as outlined above, the network 32 determines which bid prices will clear. At this time, $p_{c|j}$ is set to the clearing price and any balance is refunded to the buyer. If the bid price is less than the clearing price, $p_{c|j}$ is set to nil and the entire bid price is returned to the buyer. In either instance the transaction fee, $p_{tx|j}$ is paid. The second way that $p_{c|j}$ be set is if the data buyer opted to use the Buy Now option provided by the network 32. This option provides a way for buyers to purchase data 20 immediately, rather than waiting for the price discovery mechanism 90 to complete. In this instance a buyer can submit the current Price Book price for the atom 54 they are interested in, plus a multiple of the price volatility, σi, for the atom 54 in which they are interested, $$P_{now,i} = (1 + i\sigma_i) p_{e,i},$$

where $p_{now,i}$ is the clearing price required to obtain an atom 54 of data 20 from the network immediately, cri is the volatility of the price of the particular atom 54 over time, measured as a standard deviation and i is the scalar multiple of the volatility. i can be determined experimentally.

The price discovery and price book selection mechanism described above is one specific mechanism. Other variations of the above or existing mechanisms can be substituted. For example, for price book selection, a similar approach to the above but with a larger set of transactions, perhaps the set of transactions from multiple time intervals (t-1, t-2, and so on) could be used.

Given that $E_t$ has been selected and all the clearing transactions, Po, have been determined, the network participant who submitted the optimal Price Book as evaluated by the selection criteria is granted the price discovery reward. Given that it would be sellers who benefit from the optimal Price Book, the reward may be paid as a proportion of the transactions that take place in the time interval for which the Price Book was in use, $$I_r = \sum_j \lambda p_{c|j},$$

where $I_r$ is the reward paid to the network participant who submitted the optimal Price Book and A is the proportion of the transaction value that is paid by each seller. The value of which will be determined experimentally and will be set in such a way as to not be punitive to sellers.

The above price discovery mechanism 90 relies on buyers providing information about the value they are prepared to pay for data, even if that value is higher than the current market clearing price defined by the current Price Book (i.e. recall the definition of K). Buyers will not volunteer the information required to accurately estimate the Price Book, unless it is in their interest. An objective can be to design a reward mechanism that will minimize the following, $$p_\epsilon = \sum_j |p_{b,j} - \overline{p}_{b,j}|,$$

where $p_{b|j}$ is the actual maximum price the buyer would pay for $A_i$ and $\_{b|j}$ is the price the buyer indicates is the maximum price they are willing to pay. To accomplish this, and recalling the definition of $p_d$, we must define $p_r$ such that it is large enough to encourage honest behaviour. One should also define $p_r$ in a way that discourages dishonest sellers from placing high bids in the network in an effort to drive the market price up.

One can also define a reward pool, $r_{tx}$, which will be used to reward to honest buyers as outlined below, $$r_{tx} = \sum_j (p_{tx,j} - p_{\phi,j})$$

where $p_{\phi,j}$ is the actual network operating cost corresponding to a given transaction (e.g., the Ethereum Gas) and $p_{tx,j}$ is the token 36 transaction fee paid for the given transaction 38. Finally, one can calculate the reward normalizing factor as, $$r_n = \sum_j r_j$$

Once $r_{k,rtx}$ and $r_n$ are computed, one can calculate $p_{r,j}$, $$p_{r,j} = \frac{r_j r_{tx}}{r_n},$$

and $p_{r,j}$ is refunded to each buyer as appropriate.

It can be asserted that $p_{tx,j}$ should scale linearly with Po to ensure that the impact of $p_{tx,j}$ on $p_{d,j}$ remains proportionate to the value of the underlying data, $p_{c,j}$ also ensuring that $p_{tx,j}$ cannot be manipulated to zero by a dishonest buyer. One can propose a model, $$P_{tx,j} = \mu p_{i,e}$$

where $\mu$ is a scalar which will be determined experimentally through simulation and real-world testing, keeping in mind the objective of minimizing $p_\epsilon$ and the terms impact on $p_r$. The value of $\mu$ should be small enough to not overly penalize honest buyers who have bids that do not meet the clearing price, but high enough to discourage dishonest buyers from making repeated attempts to drag down the market price.

As discussed previously, Price Book discovery is a competitive process where network participants submit price book estimates and the one which would have generated the maximum network income becomes the new Price Book. Network participants may use any number of approaches to estimate the correct the Price Book, constrained only by computational complexity and mathematical competency. The following proposes a simplistic illustrative example of how this Price Book discovery could be approached.

Recall the definition of $A_i = (d_i, \rho_i, Y_i, T_i, \gamma_i)$, one can propose that $E_t$ can be represented as a series of points, $\overline{p}_{c,i}$ that can be modelled as a quadratic changing as a function of $\tau_i$ and $Y_i$ (as defined below) only. For this model, one can ignore the impact of $\rho_i$ and $\gamma_i$. The model proposed is, $$\overline{p}_{c,i} = \beta_{Y_i,1}\tau_i^2 + \beta_{Y_i,2}\tau_i + \beta_{Y,3}$$

It may be noted that only solutions where $\tau_i \geq 0$, $\beta_{Y,3} \geq 0$ and $\overline{p}_{c|i} \geq 0$ are valid. If one desires to discover the parameters $\beta_{Y_i,1}$, $\beta_{Y_i,2}$ and $\beta_{Y_i,3}$, which would allow one to compute values for $\overline{E}$ which maximizes $\overline{I}$ given $K_{<t}$. To achieve this, one can use a quadratic least squares regression. Once the parameters of the quadratic are determined, one can compute the values of $\overline{E}$ and submit the Price Book estimate for consideration by the network 32.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 30, any component of or related to the system 30, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

Appendix A: Smart Contract Code

```
pragma solidity 0.4.22;

contract Schema {
    address creator;
    string name;
    string definition;

event LogNewSchema();

constructor(string _name, string _definition) public {
        require(bytes(_name).length <= 256);
        require(bytes(_definition).length <= 1000);

creator = msg.sender;
        name = _name;
        definition = _definition;

emit LogNewSchema();
    } function getCreator() public constant returns (address) {
        return creator;
    } function getName() public constant returns (string) {
        return name;
    } function getDefinition() public constant returns (string) {
        return definition;
    }
} contract Owner {
  address owner;
  address newOwner;

event LogOwnershipChangeOffer(address newOwner);
  event LogOwnershipChange();
  event LogOwnershipChangeRejection();

modifier onlyOwner {
      require(msg.sender == owner);
      _;
  } modifier onlyNewOwner {
      require(msg.sender == newOwner);
      _;
```

```
    } modifier noNewOwner {
        require(newOwner == 0);
        _;
    } constructor() public {
      owner = msg.sender;
      newOwner = 0;
    } function offerOwnershipChange(address _newOwner) public onlyOwner
noNewOwner {
        require(owner != _newOwner);
        newOwner = _newOwner;
        emit LogOwnershipChangeOffer(newOwner);
    } function cancelOwnershipChange() public onlyOwner {
        require(newOwner != 0);
        newOwner = 0;
    } function acceptOwnershipChange() public onlyNewOwner {
        owner = msg.sender;
        newOwner = 0;
        emit LogOwnershipChange();
    } function rejectOwnershipChange() public onlyNewOwner {
        newOwner = 0;
        emit LogOwnershipChangeRejection();
    } function getOwner() public constant returns(address) {
        return owner;
    }
} contract Atom is Owner {
    address creator;
    address schema;

mapping(address => bool) authorizedAuctions;

string dataHash;
    AtomStorage atomStorage;

mapping(address => bool) licensedAddresses;
```

```
    event LogNewAtom();
    event LogAtomChange();
    event LogCreatedAuction(address auction);
    event LogLicenseChange(address licenseAddress);
    event LogAtomWithdraw(uint);

modifier onlyAuthorizedAuction {
        require(authorizedAuctions[msg.sender]);
        _;
    } constructor(address _schema, string _dataHash, AtomStorage
_atomStorage) public {
        require(bytes(_dataHash).length <= 256);

creator = msg.sender;
        schema = _schema;
        dataHash = _dataHash;
        atomStorage = _atomStorage;

emit LogNewAtom();
    } function setAtomStorage(AtomStorage _atomStorage) public onlyOwner
noNewOwner {
        atomStorage = _atomStorage;
        emit LogAtomChange();
    } function createAuction() public onlyOwner noNewOwner {
        AtomAuction auction = new AtomAuction(this);
        authorizedAuctions[address(auction)] = true;
        emit LogCreatedAuction(address(auction));
    } function isAuthorizedAuction(address auctionAddress) public constant
returns(bool) {
        return authorizedAuctions[auctionAddress];
    } function authorizeLicense(address newAddress) public
onlyAuthorizedAuction payable {
        licensedAddresses[newAddress] = true;
        emit LogLicenseChange(newAddress);
    } function isLicensed(address query) public constant returns(bool) {
        return licensedAddresses[query];
    } function getCreator() public constant returns (address) {
```

```
        return creator;
    } function getSchema() public constant returns (address) {
        return schema;
    } function getDataHash() public constant returns (string) {
        return dataHash;
    } function getStorage() public constant returns (AtomStorage) {
        return atomStorage;
    } function getBalance() public constant returns (uint) {
      return address(this).balance;
    } function withdraw() public onlyOwner noNewOwner returns (bool) {
        owner.transfer(address(this).balance);
        emit LogAtomWithdraw(address(this).balance);
        return true;
    }
} contract AtomAuction {
    address owner;

Atom atom;

bool started;
    bool ended;

uint clearingPrice;
    uint atomsSold;

address[] addressIndices;
    mapping(address => uint) bids;
    mapping(address => uint) pendingReturns;
    mapping(address => bool) pendingLicenses;

event LogAuctionStarted(address atom);
    event LogAuctionBid(uint bid);
    event LogAuctionBidFailed(uint bid, uint previousBid);
    event LogAuctionLoss(address bidAddress);
    event LogAuctionWinner(address bidAddress);
    event LogAuctionEnded(uint atomsSold, uint clearingPrice);
    event LogAuthorizeLicense(address buyer, uint clearingPrice);
    event LogAuctionWithdraw(uint amount);
```

```
modifier onlyOwner {
    // todo: uncomment below and have a proper owner test this
    // require(msg.sender == owner);
    _;
} modifier auctionNotStarted {
    require(!started && !ended);
    _;
} modifier auctionRunning {
    require(started && !ended);
    _;
} modifier auctionEnded {
    require(ended);
    _;
} constructor(Atom _atom) public {
    owner = msg.sender;
    atom = _atom;

started = false;
    ended = false;
    clearingPrice = 0;
    atomsSold = 0;
} function start() public onlyOwner auctionNotStarted {
    started = true;
    emit LogAuctionStarted(atom);
} function bid() public payable auctionRunning {
    if (msg.value > bids[msg.sender]) {
        uint currentBid = msg.value;
        uint previousBid = bids[msg.sender];

addressIndices.push(msg.sender);

// It is important to set this to zero because the recipient
        // can call this function again as part of the receiving call
        // before `send` returns.
        bids[msg.sender] = 0;
        pendingReturns[msg.sender] += previousBid;
        bids[msg.sender] = currentBid;
```

```
        emit LogAuctionBid(bids[msg.sender]);
    } else {
        revert();
    }
} function withdraw() public returns (bool) {
    uint amount = pendingReturns[msg.sender];
    if (amount > 0) {
        // It is important to set this to zero because the recipient
        // can call this function again as part of the receiving call
        // before `send` returns.
        pendingReturns[msg.sender] = 0;
        msg.sender.transfer(amount);
        emit LogAuctionWithdraw(amount);
    }
    return true;
} function end(uint _clearingPrice) public onlyOwner auctionRunning {
    started = false;
    ended = true;
    clearingPrice = _clearingPrice;

// todo: this loop might need to be "chunckable" e.g. < gas limit
    uint arrayLength = addressIndices.length;
    for (uint i=0; i<arrayLength; i++) {
        processBid(i);
    } emit LogAuctionEnded(atomsSold, clearingPrice);
} function processBid(uint i) internal auctionEnded {
    require(ended);

address bidAddress = addressIndices[i];
    uint bidValue = bids[bidAddress];

// It is important to set this to zero because the recipient
    // can call this function again as part of the receiving call
    // before `send` returns.
    bids[bidAddress] = 0;

if (bidValue < clearingPrice) {
        pendingReturns[bidAddress] += bidValue;

// todo: too much logging?
        emit LogAuctionLoss(bidAddress);
    } else {
        uint refund = bidValue - clearingPrice;
```

```
            pendingReturns[bidAddress] += refund;
            pendingLicenses[bidAddress] = true;
            atomsSold++;

// todo: too much logging?
            emit LogAuctionWinner(bidAddress);
        }
    } function authorizeLicense() public auctionEnded {
        require(pendingLicenses[msg.sender]);
        pendingLicenses[msg.sender] = false;
        atom.authorizeLicense.value(clearingPrice)(msg.sender);
        emit LogAuthorizeLicense(msg.sender, clearingPrice);
    } function getAtom() public constant returns (Atom) {
        return atom;
    } function getOwner() public constant returns(address) {
        return owner;
    } function getPendingBalance() public constant returns(uint) {
        return pendingReturns[msg.sender];
    }
} contract AtomStorage is Owner {
  string baseUri;

mapping(address => bool) containsAtoms;

enum RequestState {
    EMPTY,
    NEW_REQUEST_WAITING_FOR_STORAGE,
    REQUEST_ACCEPTED_WAITING_FOR_DOWNLOAD,
    REQUEST_DOWNLOADED_WAITING_FOR_VERIFICATION,
    CLAIM_OPENED,
    CLAIM_RESOLVED
  }
  struct Request {
    string publicKey;
    uint payment;
    RequestState state;
  }
  // buyer => atom => request
  mapping(address => mapping(address => Request)) requests;
  mapping(address => uint) pendingReturns;
```

```
event LogStorageAddedAtom(address atom);
event LogStorageRemovedAtom(address atom);

event LogStorageNewRequest(address user, address atom);
event LogStorageAcceptedRequest(address user, address atom);
event LogStorageRejectedRequest(address user, address atom);
event LogStorageWithdrawal(uint amount);
event LogStorageAtomDownloaded(address user, address atom, string
publicKey, string nonce);
event LogStorageAtomVerified(address user, address atom);
event LogStorageClaimFiled(address user, address atom);
event LogStorageOverriddenState(address user, address atom,
RequestState);
event LogStorageClaimResolved(address user, address atom);

constructor(string _baseUri) public {
  baseUri = _baseUri;
} function setContainsAtom(address atom) public onlyOwner noNewOwner {
  require(!containsAtoms[atom]);
  containsAtoms[atom] = true;
  emit LogStorageAddedAtom(atom);
} function clearContainsAtom(address atom) public onlyOwner noNewOwner {
  require(containsAtoms[atom]);
  delete containsAtoms[atom];
  emit LogStorageRemovedAtom(atom);
} function containsAtom(address atom) public constant returns(bool) {
  return containsAtoms[atom];
} function getBaseUri() public constant returns(string) {
  return baseUri;
} function setBaseUri(string _baseUri) public onlyOwner noNewOwner {
  baseUri = _baseUri;
}

// buyer initiates the request, storage either accepts or rejects
function createRequest(address atom, string publicKey) public payable {
  require(requests[msg.sender][atom].state == RequestState.EMPTY);
  requests[msg.sender][atom] = Request({
    publicKey: publicKey,
    payment: msg.value,
    state: RequestState.NEW_REQUEST_WAITING_FOR_STORAGE
  });
```

```
    emit LogStorageNewRequest(msg.sender, atom);
}

// storage calls when accepting request for processing
function acceptRequest(address user, address atom) public onlyOwner
noNewOwner {
    require(requests[user][atom].state ==
RequestState.NEW_REQUEST_WAITING_FOR_STORAGE);
    requests[user][atom].state =
RequestState.REQUEST_ACCEPTED_WAITING_FOR_DOWNLOAD;
    emit LogStorageAcceptedRequest(user, atom);
}

// storage calls when accepting request for processing
function rejectRequest(address user, address atom) public onlyOwner
noNewOwner {
    require(requests[user][atom].state ==
RequestState.NEW_REQUEST_WAITING_FOR_STORAGE);

uint payment = requests[user][atom].payment;
    delete requests[user][atom];
    pendingReturns[user] += payment;

emit LogStorageRejectedRequest(user, atom);
} function getPendingBalance() public constant returns(uint) {
    return pendingReturns[msg.sender];
}

// buyer calls withdraw if request is rejected
function withdraw() public returns (bool) {
    uint amount = pendingReturns[msg.sender];
    if (amount > 0) {
        // It is important to set this to zero because the recipient
        // can call this function again as part of the receiving call
        // before `send` returns.
        pendingReturns[msg.sender] = 0;
        msg.sender.transfer(amount);
        emit LogStorageWithdrawal(amount);
    }
    return true;
}

// storage logs download receipt
function createDownloadReceipt(address user, address atom, string
publicKey, string nonce) public onlyOwner noNewOwner {
    require(requests[user][atom].state ==
RequestState.REQUEST_ACCEPTED_WAITING_FOR_DOWNLOAD);
    requests[user][atom].state =
RequestState.REQUEST_DOWNLOADED_WAITING_FOR_VERIFICATION;
```

```
    owner.transfer(requests[user][atom].payment);
    emit LogStorageAtomDownloaded(user, atom, publicKey, nonce);
  }

// buyer verifies that the file was delivered
  function verifyTransaction(address atom) public {
    require(requests[msg.sender][atom].state ==
RequestState.REQUEST_DOWNLOADED_WAITING_FOR_VERIFICATION);
    delete requests[msg.sender][atom];
    emit LogStorageAtomVerified(msg.sender, atom);
  }

// buyer files a claim with the storage provider
  function fileClaim(address atom) public {
    require(requests[msg.sender][atom].state !=
RequestState.CLAIM_OPENED);
    requests[msg.sender][atom].state =  RequestState.CLAIM_OPENED;
    emit LogStorageClaimFiled(msg.sender, atom);
  }

// storage provider can modify state in response to filed claim
  // claim should be restored to CLAIM_OPENED so the buyer can officially
resolve
  // state can be changed to desired workflow state once buyer sets to
CLAIM_RESOLVED
  function overrideState(address user, address atom, uint state) public
onlyOwner noNewOwner {
    require(requests[user][atom].state != RequestState.EMPTY);
    require(state != 0);
    requests[user][atom].state = RequestState(state);
    emit LogStorageOverriddenState(user, atom, RequestState(state));
  }

// buyer rseolves an open claim with the storage provider
  function resolveClaim(address atom) public {
    require(requests[msg.sender][atom].state ==
RequestState.CLAIM_OPENED);
    requests[msg.sender][atom].state = RequestState.CLAIM_RESOLVED;
    emit LogStorageClaimResolved(msg.sender, atom);
  } function getRequest(address user, address atom) public constant
      returns(string publicKey, uint payment, RequestState state) {
    require(requests[user][atom].state != RequestState.EMPTY);
    return (
      requests[user][atom].publicKey,
      requests[user][atom].payment,
      requests[user][atom].state
      );
  }
}
```

```
// https://medium.com/@angellopozo/ethereum-signing-and-validating-
13a2d7cb0ee3
contract SignatureVerifier {
  // signature = signature.substr(2); //remove 0x
  // const r = '0x' + signature.slice(0, 64)
  // const s = '0x' + signature.slice(64, 128)
  // const vHex = '0x' + signature.slice(128, 130)
  // const v = web3.toDecimal(vHex)
  function verify(address addr, bytes32 hash, uint8 v, bytes32 r, bytes32 s) public pure returns (bool) {
      return ecrecover(hash, v, r, s) == addr;
  }
}

// Centralizes atom licensing to automatically authorize licneses based
// on market clearing prices
contract LicenseManager is Owner {
    mapping(address => string) publicKeys;

constructor() public {
        owner = msg.sender;
    } function setPublicKey(string publicKey) public {
        require(bytes(publicKey).length <= 1000);
        publicKeys[msg.sender] = publicKey;
    } function getPublicKey(address _address) public constant returns(string) {
        return publicKeys[_address];
    }
} contract DataCoin {
    address owner;
    address licenseManager;

SignatureVerifier verifier;

modifier onlyOwner {
        require(msg.sender == owner);
        _;
    } constructor() public {
        owner = msg.sender;
        licenseManager = 0;
        verifier = new SignatureVerifier();
    }
```

```
    function setLicenseManager(address _licenseManager) public onlyOwner {
        licenseManager = _licenseManager;
    } function getLicenseManager() public constant returns(address) {
        return licenseManager;
    } function getVerifier() public constant returns(SignatureVerifier) {
      return verifier;
    }
}
```

The invention claimed is:

1. A system for transacting data on a network, the system comprising:
a data submission interface, the data submission interface configured to enable one or more data generators to register data with the network, the data being stored in a location accessible to data consumers accessing the network;
a data consumer interface to enable one or more data consumers to find data on the network and transact with the one or more data generators to obtain access to and/or ownership of data submitted to the network;
a blockchain network for storing at least a ledger associated with data registered with the network via the data submission interface to provide an immutable assignment of ownership rights of the data to the respective one or more data generators, and to provide an immutable record of data transactions;
wherein the data submitted via the data submission interface is processed to conform to a schema, by matching the data with an existing schema, or creating a new schema; and
wherein the system is configured to add a new schema by:
receiving a data atom submitted to a schema design interface;
extracting one or more fields from the data atom to generate a suggested schema;
searching an existing schema index to avoid a duplicate schema; and
when not a duplicate, storing the new schema for future data submissions.

2. The system of claim 1, further comprising a price discovery mechanism coupled to the blockchain network and data consumer interface to implement a data purchase transaction process according to a predetermined economic outcome, and to store a record of the transaction in the blockchain ledger.

3. The system of claim 2, wherein the price discovery mechanism provides a bidding process wherein data consumers place bids on one or more atoms of data for purchasing or licensing transactions, and the placed bids are used to determine the transaction prices outside of the blockchain ledger.

4. The system of claim 3, wherein a clearing price is established and bidders who have met the clearing price can complete a purchase.

5. The system of claim 2, wherein the price discovery mechanism is configured to perform at least one of:
approach maximum revenue for the data generators;
approach maximum transaction volume;
apply a first price sealed auction;
apply a second price sealed auction;
apply an open ascending or an open descending price setting system; and
apply a reserve auction.

6. The system of claim 1, further comprising a data discovery mechanism provided via the data consumer interface, the data discovery mechanism configured to access the blockchain network to identify data submitted to the network and implement a search engine using that data.

7. The system of claim 1, wherein the data submission interface is in communication with a distributed application used by the one or more data generators.

8. The system of claim 1, wherein the system is configured to enable manual creation of the new schema.

9. The system of claim 1, wherein the data is persisted by the data generator to a local or third party data storage service, the system being further configured to store a mechanism providing access the data persisted by the data generator.

10. The system of claim 1, further comprising a storage module, wherein the system is configured to persist data submitted to the system in the storage module.

11. The system of claim 10, wherein the storage module is comprised by the blockchain network.

12. The system of claim 1, wherein the system is further configured to apply a cryptographic scheme or protocol to the data prior to having the data persisted.

13. The system of claim 1, wherein at least one of the one or more data generators is registered on the network, the registration is stored in the blockchain network, and the system is configured to enable registered data generators storage access to submit data to the network.

14. The system of claim 1, wherein the blockchain ledger comprises one or more of the following:
a license of recorded data-stream views;
a license of live data-stream views;
a record of a sale of an entire data-stream, a sale of generators, or a sale of partial data-streams with a mechanism to pay all owners their share when stream is licensed;
a record of a sale of a license to the data;
a record of a purchase to signal creation of future data-streams; and
a record of a purchase to signal creation of future outcomes, achieved by agreeing to purchase data metrics that meet one or more criteria.

15. A method of transacting data on a network, comprising:
providing a data submission interface to enable one or more data generators to register data with the network, and to enable the data to be stored in a location accessible to data consumers accessing the network;
providing a data consumer interface to enable one or more data consumers to find data on the network and transact with the one or more data generators to obtain access to and/or ownership of data submitted to the network; and
providing a blockchain network for storing at least a ledger associated with data registered with the network via the data submission interface to provide an immutable assignment of ownership rights of the data to the respective one or more data generators, and to provide an immutable record of data transactions;
wherein the data submitted via the data submission interface is processed to conform to a schema, by matching the data with an existing schema, or creating a new schema; and
wherein the system is configured to add a new schema by:
receiving a data atom submitted to a schema design interface;
extracting one or more fields from the data atom to generate a suggested schema;
searching an existing schema index to avoid a duplicate schema; and
when not a duplicate, storing the new schema for future data submissions.

16. The method of claim 15, further comprising providing a price discovery mechanism coupled to the blockchain network and data consumer interface to implement a data purchase transaction process according to a predetermined economic outcome, and to store a record of the transaction in the blockchain ledger.

17. The method of claim 16, wherein the price discovery mechanism provides a bidding process wherein data consumers place bids on one or more atoms of data for purchasing or licensing transactions, and the placed bids are used to determine the transaction prices outside of the blockchain ledger.

18. The method of claim 17, wherein a clearing price is established and bidders who have met the clearing price can complete a purchase.

19. The method of claim 16, wherein the price discovery mechanism is configured to perform at least one of:
approach maximum revenue for the data generators;
approach maximum transaction volume;
apply a first price sealed auction;
apply a second price sealed auction;
apply an open ascending or an open descending price setting system; and
apply a reserve auction.

20. The method of claim 15, further comprising providing a data discovery mechanism via the data consumer interface, the data discovery mechanism configured to access the blockchain network to identify data submitted to the network and implement a search engine using that data.

21. The method of claim 15, wherein the data submission interface is in communication with a distributed application used by the one or more data generators.

22. The method of claim 15, further comprising enabling manual creation of the new schema.

23. The method of claim 15, wherein the data is persisted by the data generator to a local or third party data storage service, the system being further configured to store a mechanism providing access the data persisted by the data generator.

24. The method of claim 15, wherein the system further comprises a storage module, the method further comprising persisting data submitted to the system in the storage module.

25. The method of claim 24, wherein the storage module is comprised by the blockchain network.

26. The method of claim 15, further comprising applying a cryptographic scheme or protocol to the data prior to having the data persisted.

27. The method of claim 15, wherein at least one of the one or more data generators is registered on the network, the registration is stored in the blockchain network, and the method further comprises providing registered data generators with storage access to submit data to the network.

28. The method of claim 15, wherein the blockchain ledger comprises one or more of the following:
a license of recorded data-stream views;
a license of live data-stream views;
a record of a sale of an entire data-stream, a sale of generators, or a sale of partial data-streams with a mechanism to pay all owners their share when stream is licensed;
a record of a sale of a license to the data;
a record of a purchase to signal creation of future data-streams; and
a record of a purchase to signal creation of future outcomes, achieved by agreeing to purchase data metrics that meet one or more criteria.

29. A non-transitory computer readable medium comprising computer executable instructions which cause a computer to execute a method comprising:
providing a data submission interface to enable one or more data generators to register data with the network, and to enable the data to be stored in a location accessible to data consumers accessing the network;
providing a data consumer interface to enable one or more data consumers to find data on the network and transact with the one or more data generators to obtain access to and/or ownership of data submitted to the network; and
providing a blockchain network for storing at least a ledger associated with data registered with the network via the data submission interface to provide an immutable assignment of ownership rights of the data to the respective one or more data generators, and to provide an immutable record of data transactions;
wherein the data submitted via the data submission interface is processed to conform to a schema, by matching the data with an existing schema, or creating a new schema; and
wherein the system is configured to add a new schema by:
receiving a data atom submitted to a schema design interface;
extracting one or more fields from the data atom to generate a suggested schema;
searching an existing schema index to avoid a duplicate schema; and
when not a duplicate, storing the new schema for future data submissions.

30. The system of claim 3, wherein the price discovery mechanism occurring outside of the blockchain ledger is coordinated at least in part via a distributed application used by the one or more data consumers.

31. The system of claim 2, wherein the one or more data consumers pay prices to place bids, and winning bidders receive rewards.

32. The system of claim 31, wherein received rewards are proportional to winning bids.

33. The system of claim 2, wherein the price discovery mechanism is completed without participation of the one or more data generators.

34. The system of claim 2, wherein the price discovery mechanism requires the bidding data consumers to submit security accepted by the blockchain ledger in order to place bids.

35. The system of claim 2, wherein the price discovery mechanism is based on one or more of: a time of the data being generated, and a verification status of the one or more data generators.

* * * * *